United States Patent [19]
Kunita

[11] Patent Number: 5,724,526
[45] Date of Patent: Mar. 3, 1998

[54] ELECTRONIC INTERPRETING MACHINE

[75] Inventor: Hisao Kunita, Mie, Japan

[73] Assignee: Sharp Kabushiki Kaisha, Osaka, Japan

[21] Appl. No.: 573,400

[22] Filed: Dec. 15, 1995

[30]  Foreign Application Priority Data

Dec. 27, 1994  [JP]  Japan .................... 6-326234

[51] Int. Cl.⁶ ........................................................ G10L 5/00
[52] U.S. Cl. ........................... 395/277; 395/2.63; 395/254
[58] Field of Search ................................. 395/2.63, 2.85, 395/2.86, 2.87

[56]  References Cited

U.S. PATENT DOCUMENTS

| | | | |
|---|---|---|---|
| 4,613,944 | 9/1986 | Hashimoto et al. | 395/2.86 |
| 4,984,177 | 1/1991 | Rondel et al. | 395/2.86 |

FOREIGN PATENT DOCUMENTS

| | | | |
|---|---|---|---|
| 60-75964 | 4/1985 | Japan . | |
| 61-228573 | 10/1986 | Japan . | |
| 4-42363 | 2/1992 | Japan . | |

*Primary Examiner*—Allen R. MacDonald
*Assistant Examiner*—Susan Wieland
*Attorney, Agent, or Firm*—Nixon & Vanderhye P.C.

[57]  ABSTRACT

An electronic interpreting machine comprising vocal input device for vocal input of a language, dictionary device incorporating an input language dictionary and an output language dictionary, language setting device for setting the input language as the first language and the output language as the second language, voice recognition device for recognizing and storing the first language, translating device for translating the first language which has been recognized into the selected second language, voice information generating device for generating voice information representing the translated second language, and voice output device for giving output of the voice information, wherein the maximum amount of language information which can be vocally input is set beforehand, while information volume computing device that computes the ratio of the amount of information which has been input to the vocal input device to the maximum amount of information which can be input in real time, and computed information notifying device for notifying the result of computation are provided.

9 Claims, 19 Drawing Sheets

FIG. 9

| No | Voice or key input | Screen display | No | Voice or key input | Screen display |
|---|---|---|---|---|---|
| D9-1 | Vocal input in 1st language starting screen | Please speak.<br><br>Memory occupied | | | |
| D9-2 | 「コンニチワワタシハ ハヤカワコウギョウノ ヤマダトモウシマス」 | Please speak.<br><br>Memory occupied | | | |
| D9-3 | 「キョウハワガシャデ カイハツチュウノシンセイ ヒンノケンデオウカガイ イタシマシタ」 | Please speak.<br><br>Memory occupied | | | |
| D9-4 | 「コンカイゴショウカイノ シンセイヒンハ……ーーー」 | Please speak.<br><br>Memory occupied | | | |
| D9-5 | 「シタガイマシテ…ーーー」 | Capacity will soon Cut your talk short.<br>Memory occupied | | | |
| | | | | | |
| | | | | | |

FIG. 10

| 1st language | Screen display | Vocal output |
|---|---|---|
| (Japanese) | 聞き取れませんでした。恐れ入りますがもう一度ていねいにお話し下さい。 | キキトレマセンデシタ オソレイリマスガモウイチドテイネイニオハナシクダサイ。 |
| (English) | I beg your pardon. Please speak one more time correctly. | I beg your pardon. Please speak one more time correctly. |

FIG. 12

| No. | Voice or key input | Screen display | No. | Voice or key input | Screen display |
|---|---|---|---|---|---|
| D12-1 | (Vocal input in 1st language) ワタシハコンシュウ アメリカエシュッチョウ ノヨテイデス | Please speak. Memory occupied ▨▨▨▨ | D12-7 | INS | (Specify the point of correction.) 私は□アメリカへ出張の予定です。 |
| D12-2 | NE↑ | (Input text) OK? 私は今週アメリカへ出張の予定です。 | D12-8 | ENT | Please speak. (Correction) Memory occupied |
|  |  |  | D12-9 | (Vocal input of correcting text) コトシノアキ | Please speak. (Correction) Memory occupied ▨ |
| D12-3 | COR | Specify the method of correction. 1: Correction by vocal input 2: Correction by key input | D12-10 | ENT | (Specify the point of correction.) 私は今年の秋アメリカへ出張の予定です。 |
| D12-4 | 1 | (Specify the point of correction.) 私は今週アメリカへ出張の予定です。 | D12-11 | OK (Translation direction) | (Translation sentence) I will go to America on my business this autumn. |
| D12-5 | ▶ ▶ | (Specify the point of correction.) 私は今週アメリカへ出張の予定です | D12-12 | | (Display of the translated text is continued while the translated text is output by voice.) |
| D12-6 | DEL | (Specify the point of correction.) 私はアメリカへ出張の予定です。 | D12-13 | In case the OK key is not pressed within a specified period of time after the vocal output of the translated text, the first language and the second language are automatically interchanged and enters the next vocal input mode. | Please speak correctly. Input level |

FIG.14

| No. | Voice or key input | Screen display | No. | Voice or key input | Screen display |
|---|---|---|---|---|---|
| D14-1 | MEN | (Select a function.)<br>1: Interpret<br>2: Retrieve stored text.<br>3: Print stored text.<br>4: Adjust display contrast | D14-8 | ENT<br>(End of correction) | (Japanese into English)<br>今日は我社で開発中の新製品の件でお伺い致しました。今回御紹介の新製品‥‥‥ |
| D14-2 | 2<br>(Retrieval of stored text is selected.) | (Information on 1st speaker)<br>Ichiro Yamada<br>Hayakawa Kogyo Co., Ltd.,<br>Planning Department<br>TEL 06-234-7899 | D14-9 | After displaying the above screen for a specified period of time, returns to the initial screen. | (Select a function.)<br>1: Interpret<br>2: Retrieve stored text.<br>3: Print stored text.<br>4: Adjust display contrast. |
| D14-3 | ▼▼▼<br>▼▼▼ | (Information of 2nd Speaker)<br>Robert Smith<br>ABC cooperation<br>Sales manager<br>Madison Avenue<br>New York | D14-10 | 3 | In print. |
| D14-4 | ▼ ‥‥ ▼ | (Japanese into English)<br>今日は私は早川工業の山田と申します。<br>今日は我社で開発中の | D14-11 | (After printing) | (Select a function.)<br>1: Interpret<br>2: Retrieve stored text.<br>3: Print stored text.<br>4: Adjust display contrast. |
| D14-5 | COR | (Specify the point of correction.)<br>今日は私は早川工業の山田と申します。<br>今日は我社で開発中の | | | |
| D14-6 | DEL<br>Delete the self introduction from the stored text. | (Specify the point of correction.)<br>私は早川工業の山田と申します。今日は我社で開発中の新製品の件でお伺い致しました。今日御紹介の新製品は | | | |
| D14-7 | DEL ‥‥ DEL | (Specify the point of correction.)<br>今日は我社で開発中の新製品の件でお伺い致しました。今日御紹介の新製品は‥‥‥ | | | |

FIG. 17

| No. | Voice or key input | Screen display | No. | Voice or key input | Screen display |
|---|---|---|---|---|---|
| D17-1 | [ON] After displaying the initial screen for a specified period of time, automatically switches to the next menu screen. | 電子通訳機 Electornic Interpreter | D17-8 | [1] (Vocal input mode is selected.) | (Registration of 1st speaker information) Enter your name. Memory occupied |
| D17-2 | | (Select a function.) 1: Interpret 2: Retrieve stored text. 3: Print stored text. 4: Adjust display contrast. | D17-9 | ヤマダイチロウ [ENT] | (Registration of 1st speaker information) Enter your company name. Memory occupied |
| D17-3 | [1] (Interpret mode is selected.) | (Select the 1st language.) 1. Japanese 2. English 3. German 4. French 5. Spanish | D17-10 | ハヤカワコウギョウカブ シキガイシャ キカクブ [ENT] | (Registration of 1st speaker information) Enter your address. Memory occupied |
| D17-4 | [1] (Japanese is selected.) | (Select the 2nd language.) 1. Japanese 2. English 3. German 4. French 5. Spanish | D17-11 | [ENT] (Input of address is omitted.) | (Registration of 1st speaker information) Enter your telephone number. Memory occupied |
| D17-5 | [2] (English is selected.) | (Do you want the conversational text stored? 1. No 2. Yes | D17-12 | ビロクハイフン ニナンヨンハイフン ナナハチキュウキュウ [ENT] | (Registered information) OK? 山田一郎 早川工業株式会社 企画部 (TEL)06-234-7899 |
| D17-6 | [2] (Storage mode is selected.) | (Do you want the speaker information registered?) 1. No 2. Yes | D17-13 | [OK] | (Regist. of 2nd speaker) Input your name Input level |
| D17-7 | [2] (Speaker information storage mode is selected.) | (Select the method of registration.) 1. Register by vocal input. 2. Register by key input. | D17-14 | Robert Smith [ENT] | (Regist. of 2nd speaker) Input your company Input level |

FIG. 18

| No. | Voice or key input | Screen display | No. | Voice or key input | Screen display |
|---|---|---|---|---|---|
| D17-15 | ABC cooperation Sales manager [ENT] | (Regist. of 2nd Speaker) Input Address Input level | | | |
| D17-16 | Madison Avenue New York [ENT] | (Regist. of 2nd Speaker) Input TEL number Input level | | | |
| D17-17 | Zero one one two three four five six seven eight [ENT] | (Information) OK? Robert Smith ABC cooperation Sales manager Madison Avenue New York ↓ | | | |
| D17-18 | [▼] | Robert Smith ABC cooperation Sales manager Madison Avenue New York ↑ (TEL)011-234-5678 | | | |
| D17-19 | [OK] Registration of speaker information completed. Set input mode of conversation in 1st language. | Please speak. Memory occupied | | | |

FIG. 19

MINUTES  1994 2 28  1:30 AM

第1話者 (1st Speaker)    第2話者 (2nd Speaker)

```
山田一朗
早川工業株式会社
企画部
(TEL)06-234-7899
```

```
Robert Smith
ABC cooperation
Sales manager
Madison Avenue
New York
(TEL) 0112345678
```

今日は我社で開発中の新製品
の件でお伺いしました。
今回御紹介の新製品は‥‥
‥‥‥‥‥

Today, I visited here
on the business of new
product that is under
development in our company.
Introducing new product in
this time is‥‥‥‥‥‥‥
‥‥‥

こんにちは。お会い出来て嬉しく思い
ます。どうぞお楽になさって下さい。
の新製品を

Hello, it's nice to meet you.
Please make yourself comfort-
able. Now we are looking
foward to your new product
and ‥‥‥‥‥

ELECTRONIC INTERPRETING MACHINE

BACKGROUND OF THE INVENTION

1. Field of the Invention

The present invention relates to an electronic interpreting machine and, more particularly, an electronic interpreting machine which is capable of processing vocal input and output of conversation between different languages such as Japanese, English, French and German.

2. Description of the Related Art

As CPUs having high data processing speeds have been developed and compact memory devices having large storage capacities have been produced at low prices in recent years, electronic apparatuses for automatic translation or automatic interpretation have advanced and, for example, electronic translation machine and electronic interpreting machine having such functions as described in the prior art 1 through 3 described in the following have been proposed.

Example 1 of the prior art, as disclosed in the Japanese Patent Unexamined No. 60-75964 Publication, is an electronic translation machine which has a source language input section for multiple languages, a translated language output section for multiple languages and an electronic translation section for translating the source language into the destination language, and carries out simultaneous translation between a plurality of languages.

Example 2 of the prior art, as disclosed in the Japanese Patent Unexamined No. 61-228573 Publication, is an electronic interpreting machine which has vocal information input means for the input of a source language, voice recognition means for recognizing vocal information, electronic translation means for translating the source language into a destination language, voice synthesis means for transforming the translated language into vocal information and vocal information output means to output the vocal information, thereby to translate the source language into the destination language sentence by sentence, while the vocal information input means and the vocal information output means each has a selector section for a plurality of languages so that each can select one language independent of the other, and the texts of the source language and the destination language can be displayed on a display device at the same time.

Example 3 of the prior art, as disclosed in the Japanese Patent Unexamined No. 4-42363 Publication, is a portable voice recognition electronic dictionary which has voice input means, voice recognition means, translation means, display means for displaying the result of translation and control means for controlling various functions and, in case a word which has once been input and recognized includes an error, allows it to correct the error by means of vocal input in the unit of a single sound or a single syllable.

However, although technology for simultaneous translation between a plurality of languages is described for the electronic translation machine of the example 1 of the prior art disclosed in the Japanese Patent Unexamined No. 60-75964 Publication, fully simultaneous translation is technically extremely difficult and requires it to process data within the upper limit of a work area (RAM) for any of the voice input, voice recognition, translation and voice synthesis processes. Therefore, a speaker who inputs voice information in first language cannot input conversational texts continuously and unlimitedly. Instead, the speaker must interrupt the input of conversation within the upper limit of the work area. Otherwise, input of the conversation will be rejected when it exceeds the capacity of the work area, thus disabling it to completely interpret the conversation.

Specification of the electronic interpreting machine of example 2 of the prior art disclosed in the Japanese Patent Unexamined No. 61-228573 Publication describes a technology capable of simultaneously displaying the source language and the destination language of translation between a plurality of languages. However, it is practically impossible, even in the future, to recognize with 100% certainty the vocal input of any speakers which may speak in a dialect or with provincial accent. Thus it can be easily expected that such a situation will arise rather frequently as the electronic interpreting machine provided with vocal input function cannot recognize the vocal input in actual scenes of use thereof.

Therefore, because the electronic interpreting machine is not made in such a configuration that informs the user of the rate of recognition of the first language which has been vocally input or of the fact that the first language has not been recognized at all, the user is unable to know whether the vocal input could not be recognized or was impossible to translate.

Usually it is impossible to recognize with 100% accuracy the first language which has been vocally input and, in addition to a case of inability to recognize at all, such a case will naturally arise that the vocally input word is mistaken for a homophone or a different word which is pronounced similarly. In case a conversational text recognized mistakenly is translated without correction, the intended message cannot be conveyed to the other party of conversation, resulting in misunderstanding or conversation which does not make sense.

The Japanese Patent Unexamined No. 4-42363 Publication of example 3 of the prior art describes a technology which, when a word that has been input and recognized includes an error, is capable of correcting it by doing over the vocal input. However, because the correction is limited to vocal input, errors of homophones and different words pronounced similarly may not be properly corrected.

In addition, while the prior arts described above propose technologies which are capable of selecting the first language as the input language and the second language as the output language separately, they are not configured so as to automatically switch the first language and the second languages in a predetermined timing.

However, in an ordinary conversation, a speaker of the first language and a speaker of the second language speak alternately, so that the conversation proceeds with each of the speakers expressing his or her notion. In case the apparatus requires it to manually select the first language or the second language every time the speaker changes, it is too inconvenient to have smooth conversation.

Also in the prior art, the configuration does not include a memory device for storing the translated words or conversational text and a printing device for print out.

Consequently, when conversation is held between different languages by using such an electronic interpreting machine as proposed previously, contents of the conversation are lost as temporary data. And it is necessary to write down every word or record the conversation on a tape recorder, when it is desired to keep a record of the conversation.

In case a memory device for storing the translated conversational text and a printing device for printing out the contents of the memory are provided, for example, it is made possible to print out the contents of the memory. However, in order to keep a record of proceedings, such functions are necessary that delete unnecessary notions and to add commentary or explanation of words or phrases which are difficult to comprehend. Without such editing functions, it is not possible to compile a useful record of conversations.

SUMMARY OF THE INVENTION

The present invention has been made to solve the problems described above. An object of the invention is to provide an electronic interpreting machine which makes it possible to hold smooth conversation between different languages, by displaying the rate of memory used up to store the first language which has been vocally input, in terms of a numerical value or a graph, for example. This enables the speaker to make vocal input while placing pauses by checking the progress of the input, so as to avoid such a situation that the conversational text is interrupted amid a phrase.

Thus, the present invention provides an electronic interpreting machine comprising vocal input means for vocal input of a language, dictionary means incorporating an input language dictionary for recognizing an input language which is vocally input as first language and one or more output language dictionary for translating the first language into another language, language setting means for setting the input language as the first language and the output language as the second language, voice recognition means for recognizing the first language with reference to the dictionary means and storing the first language, translating means for translating the first language which has been recognized into the selected second language with reference to the dictionary means, voice information generating means for generating voice information that represents the translated second language, and voice output means for giving output of the generated voice information, wherein the maximum amount of information which can be vocally input is set in advance, while information volume computing means for realtime computation of the ratio of the amount of information, which is input to the vocal input means, to the maximum amount of information which can be input and computed information notifying means for notifying the result of computation are provided.

Another object of the invention is to provide an electronic interpreting machine that, when the first language which has been vocally input has not been correctly recognized, outputs a message in the first language by means of display and a vocal message to notify the speaker that the voice input could not be recognized and prompt the speaker to make accurate vocal input, thereby to prepare for a retrial of vocal input with accurate pronunciation, thus making it possible to continue correct conversation.

Further another object of the invention is to provide an electronic interpreting machine that, when part or whole of a conversational text which has been vocally recognized includes an error, allows to correct the error by either vocal input or key input, thereby making it possible to continue correct conversation.

Further another object of the invention is to provide an electronic interpreting machine that enables it to continue conversation between different languages smoothly, by automatically switching the language which is set for the first language or the second language and the dictionary thereof to confirm and translate it every time a conversational text of the first language which has been vocally input is translated into the second language, thereby making it unnecessary to select the input language and the output language by key operation every time.

Further another object of the invention is to provide an electronic interpreting machine that stores the whole conversational text exchanged between the first language and the second language in a specified memory area upon storage command, and converts the entire conversational texts which is stored to a specified printing format and prints it out upon print command, so that the print-out can be used as a record of proceedings or a chronological record of the conversation.

Further another object of the invention is to provide an electronic interpreting machine that has editing functions to retrieve a conversational text which is stored in a specified memory area onto a screen and carry out deletion, addition, correction and other operation, and is capable of compiling more useful record of proceedings or a chronological record of the conversation.

Further another object of the invention is to provide an electronic interpreting machine that is capable of setting the inputs of date and place of conversation, names, addresses and company names of the speakers and other supplementary information and storing them when storing the text of conversation between speakers of the first language and the second language in a specified memory area, and printing out the supplementary information together with the conversational text as required, and is capable of compiling an official record of proceedings or a chronological record of the conversation.

BRIEF DESCRIPTION OF THE DRAWINGS

The accompanying drawings are as follows:

FIG. 9 is an explanatory drawing showing an example of screen display related to the first embodiment.

FIG. 10 is an explanatory drawing showing an example of screen display related to the second embodiment.

FIG. 12 is an explanatory drawing showing key operation and an example of screen display related to the third embodiment.

FIG. 14 is an explanatory drawing showing examples of key operation and screen display related to the sixth embodiment.

FIG. 17 is an explanatory drawing showing an example of key operation and example 1 of screen display related to the seventh embodiment.

FIG. 18 is an explanatory drawing showing an example of key operation and example 2 of screen display related to the seventh embodiment.

FIG. 19 is an explanatory drawing showing an example of print-out of a stored text.

DESCRIPTION OF THE PREFERRED EMBODIMENTS

The invention will be described below in detail according to the preferred embodiments shown in the accompanying drawings. The present invention is by no means restricted by these embodiments. The invention is applied mainly to electronic translation apparatus for translation between different languages, electronic interpreting machine, electronic dictionary and the like, and the component elements constitute the electronic interpreting machine of the invention.

Figure 1:
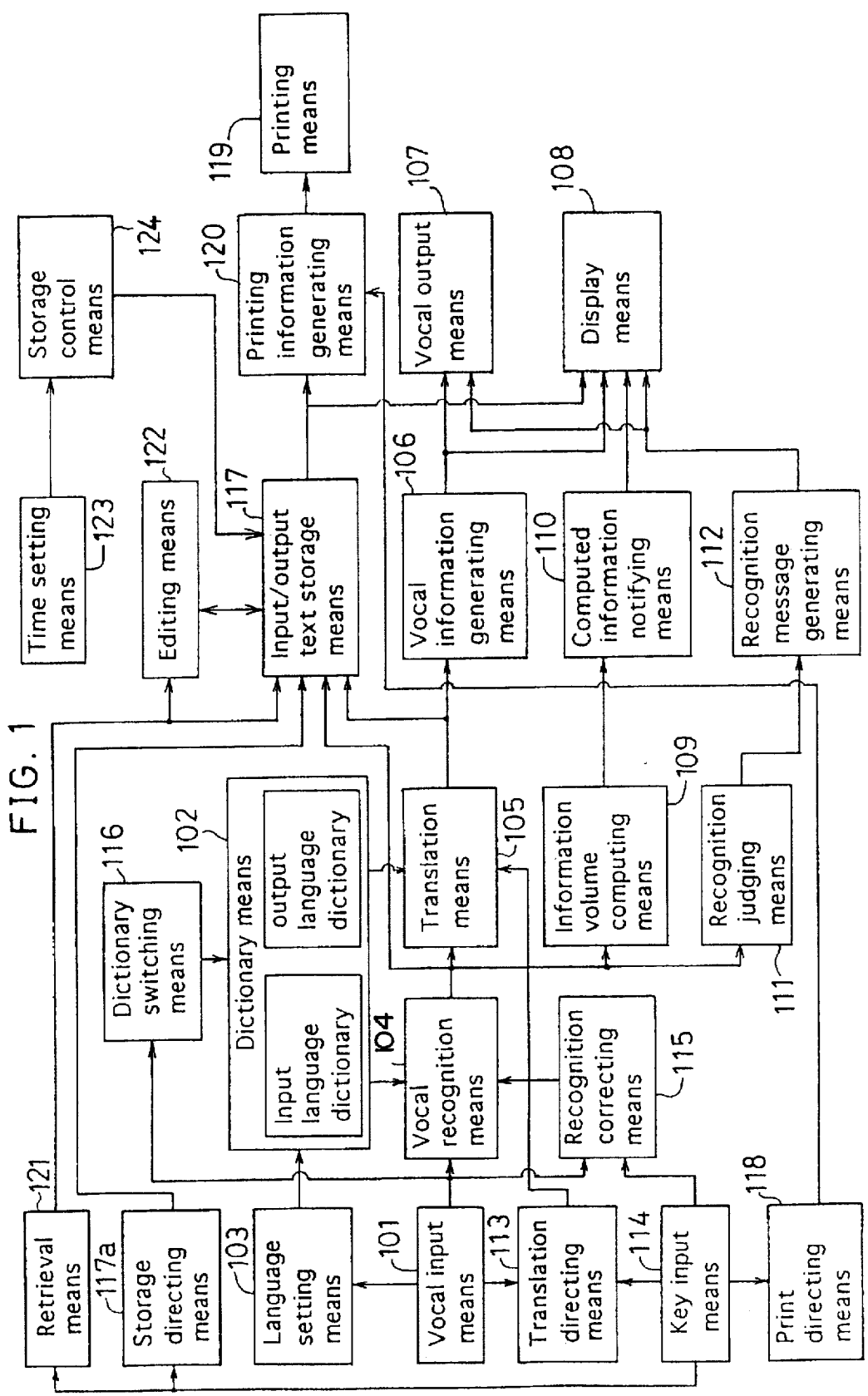
FIG. 1 is a block diagram showing the basic configuration of the invention.

FIG. 1 is a block diagram showing the basic configuration of the invention. As shown in FIG. 1, the invention provides an electronic translation machine comprising vocal input means 101 for vocal input of a language, dictionary means 102 incorporating an input language dictionary for recognizing an input language which is vocally input as first language and one or more output language dictionary for translating the first language into another language, language setting means 103 for setting the input language as the first language and the output language as the second language, voice recognition means 104 for recognizing the first language, which has been vocally input, with reference to the dictionary means 102 and storing the first language, translating means 105 for translating the first language into the selected second language with reference to the dictionary means 102, voice information generating means 106 for generating voice information representing the translated second language, and voice output means 107 for giving output of the generated voice information, wherein the maximum amount of language information which can be vocally input is set in advance, while information volume computing means 109 for realtime computation of the ratio of the amount of information which has been input to the vocal input means 103 to the maximum amount of input information which can be stored, and computed information notifying means 110 for notifying the result of computation are provided.

Thus by giving the user realtime notification of the rate of memory used up to store the language which has been vocally input, in terms of a numerical value or a graph, for example, the user can make vocal input while placing pauses by checking the progress of the input, making it possible to prevent mis-interpretation. Result of computation may be converted to color notification signals or voice notification signals, in addition to the notification signals of numerical values or graph.

In the basic configuration of the invention shown in FIG. 1, a microcomputer comprising CPUs, ROM, RAM, timer, I/O port, data bus and control bus line are used for the dictionary means 102, language setting means 103, voice recognition means 104, translating means 105, voice information generating means 106, information volume computing means 109, computed information notifying means 110, recognition judging means 111, recognition message generating means 112, translation directing means 113, recognition correcting means 115, dictionary switching means 116, input/output text storage means 117, print directing means 118, printing information directing means 120, retrieval means 121, editing means 122, time setting means 123 and storage control means 124.

Among the means described above, the voice recognition means 104, the translating means 105, the voice information generating means 106, the information volume computing means 109, the computed information notifying means 110, the recognition judging means 111, the recognition message generating means 112, the dictionary switching means 116, the printing information generating means 120, the retrieval means 121, the editing means 122., the time setting means 123 and the storage control means 124 are constituted of a plurality of CPUs, and the ROM includes various control programs that function as the above means stored therein.

For the dictionary means 102, a ROM that stores information on multiple languages is used, and an extension IC card slot, designed so that an IC card that stores extended language information can be used, is provided in a main body of the apparatus.

For the conversational text storage means 117, a RAM is used while various information generated by the voice information generating means 106, the computed information notifying means 110, and the recognition message generating means 112 is stored in the RAM.

For the time setting means 123, the timer is used in addition to the CPU.

For the voice input means 101, for example, a microphone is used. For the voice output means 107, for example, a speaker is used.

For the display means 108, an LCD (liquid crystal display) device or an ELD (Electro-luminescence display) device is used.

For the key input means 114, a keyboard (key pad) or a pen is used.

For the printing means 119, a thermal printer, a laser printer or the like is used for printing the stored conversational text, and a RS232C interface for connecting the printer is provided in the apparatus.

For the language setting means 103, the translation directing means 113, the print directing means 118 and the retrieval means 121 are used the vocal input means 101, the key input means 114 and menu screen as input devices.

Such a configuration is preferable that is further provided with recognition judging means 111 for judging whether the voice recognition means 104 correctly recognized the first language which was vocally input or not, and recognition message generating means 112 which, in case it is judged that the first language was not correctly recognized, generates a recognition message in the first language to notify the incorrect recognition and prompt retrial of input in the first language and outputs the message to the voice output means 107 or to the display means 108.

Therefore, in case of failure in voice recognition, a recognition message output in the first language by display and voice to notify the speaker that the voice recognition was failure and prompt the speaker to make accurate vocal input with accurate pronunciation, thereby to prepare for a retrial of vocal input, so that the speaker can properly understand the message and do over the vocal input with accurate pronunciation, thus making it possible to continue correct conversation.

It is preferable to make in such a configuration that is further provided with translation directing means 113 which outputs a direction to start translation to the translation means 105 when the first language is correctly recognized by the voice recognition means 104, key input means 114 for making correction input when the recognized first language includes an error and recognition correcting means 115 for correcting the first language according to the correction input from the key input means 114 or the correction input from the voice input means 103.

Thus in case a word or whole sentence of input/output text (conversational text, for example) which has once been vocally recognized includes an error, the erroneous word or sentence can be corrected by either vocal input or key input, so that correct conversation can be continued.

It is preferable to make in such a configuration that is further provided with dictionary switching means 116 that automatically switches the input language dictionary for the recognition of the first language and the output language dictionary for the translation from the first language to the second language, when the translating means 105 has translated the first language to the selected second language and one paragraph of the translation is completed.

Thus translation is carried out while automatically switching the language to be set as the first language or the second language and the dictionary thereof, so that conversation between different languages can be smoothly continued.

It is preferable to make in such a configuration that is further provided with input/output text storage means 117 that stores the entire input/output text exchanged between the first language and the second language in a specified memory area, print directing means 118 that directs print-out of the stored input/output text, and printing information generating means 120 that converts the input/output text to the specified print format and outputs it onto the printing means 119 upon printing direction from the print directing means 118.

Thus it is made possible to store the entire input/output text (conversational text) exchanged between the first language and the second language in the specified memory area, and convert the entire conversational text which has been stored to the specified print format and print it out upon printing direction.

It is preferable to make in such a configuration that is further provided with retrieval means 121 that retrieves the input/output text stored in the input/output text storage means 117 onto the screen of the display means 108 and editing means 122 for making edit operations such as addition, deletion and correction to the retrieved input/output text.

Thus it is made possible to retrieve the input/output text (conversational text) stored in the specified memory area onto the screen and carry out edit operations such as deletion, addition and correction to the retrieved input/output text.

It is preferable to make in such a configuration that is further provided with time setting means 123 for setting the year, month and day when the input/output text is exchanged between the first language and the second language.

It is preferable to make in such a configuration that is further provided with storage control means 124 that, when supplementary information such as the place of exchanging the input/output text between the first language and the second language, names, addresses and company names of speakers is input, adds the supplementary information including the date to the input/output text and stores it in the specified memory area of the input/output text storage means 117.

Thus it is made possible to set and store the supplementary information such as the place of conversation and names, addresses and company names of the speakers when storing the entire input/output text (conversational text) exchanged between the speakers of the first language and the second language in a specified memory area. Further, the supplementary information can be printed out together with the conversational text as required.

As shown in FIG. 1, the electronic interpreting machine according to the present invention is provided with the means 101 to 124 in order to perform each of the functions as described above. Here, depending on the needs, the means 111 to 124 may be selectively operated. In other words, some of the means 111 to 124 may be selected and operated so that a combination of those means may perform a desired function.

Figure 2:
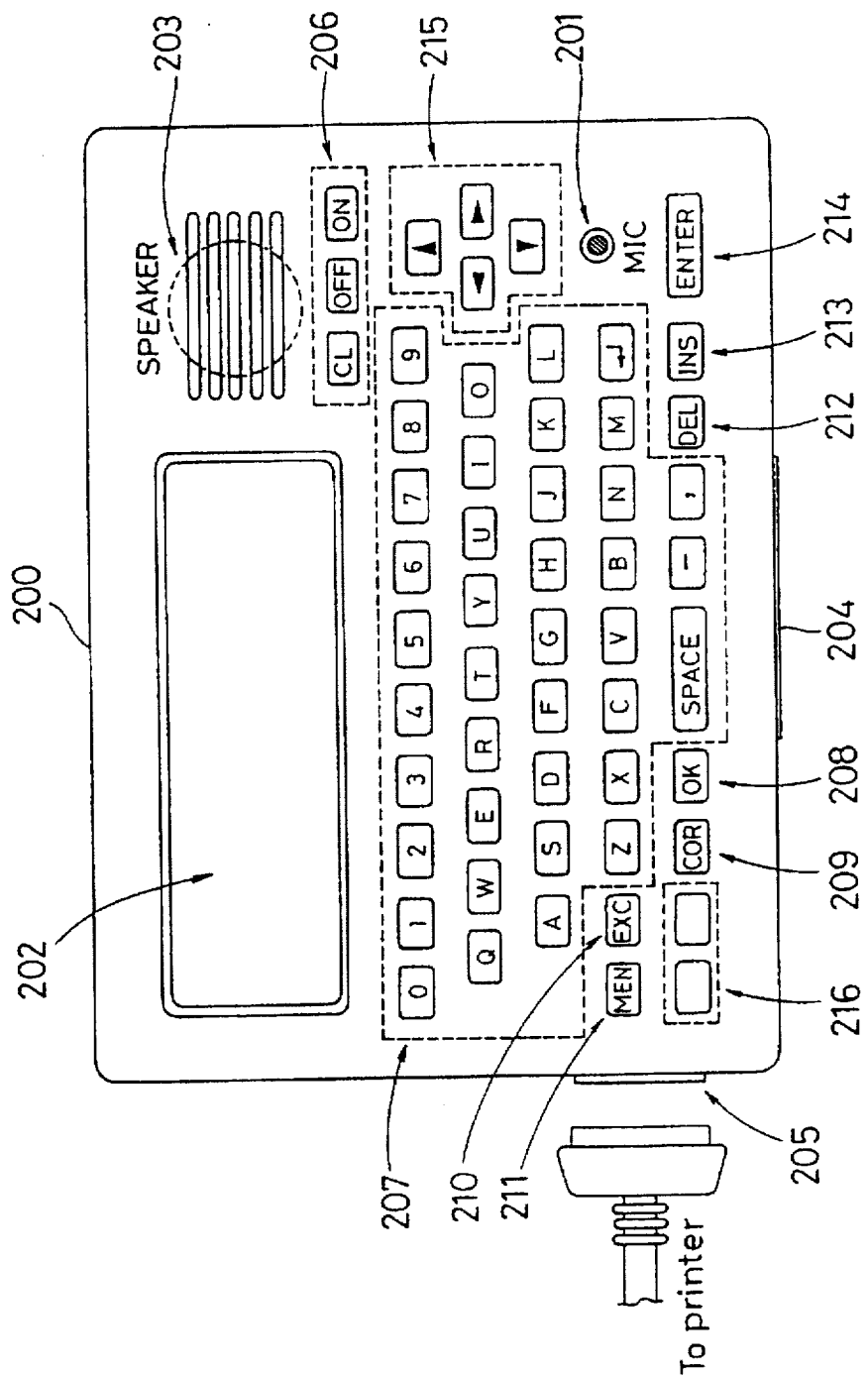
FIGS. 2(a) and 2(b) are an overview showing an embodiment of the electronic interpreting machine of the invention.

FIG. 2 is an overall view showing an embodiment of the electronic interpreting machine of the invention. In FIG. 2, FIG. 2(A) is a front view and FIG. 2(B) is a side view. First, the overview of the embodiment of the invention will be described below.

As shown in FIG. 2, numeral 200 denotes a main body. Numeral 201 denotes a microphone (MIC) for vocal input of the conversational text of first language, which is installed on the main body 200. Numeral 202 denotes a display device which may be either a liquid crystal display or other, such as an EL display device. Numeral 203 denotes a speaker (voice output device) for voice output of the translated conversational text of the second language.

Numeral 204 denotes an insertion slot for language extension IC card used for extending the kinds of language used in conversation. Stored interchangeably in the language extension IC card are multiple kinds of dictionary comprising the first language which is the input language and the second language which is the output language.

Numeral 205 denotes a printing information output terminal for the connection of an external printing device when conversational text stored in the memory (not shown in the drawing) of the main body is printed out. Although the printing device is provided outside the main body in the embodiment of the invention, the invention may also be configured in an electronic interpreting machine of completely integrated configuration having an exclusive printer built in the main body.

Numeral 206 denotes an on key ("ON") and off key ("OFF") for turning on and off the power of the main body 200 and a clear key ("CL") for clearing the display screen.

Numeral 207 denotes a set of keys (keyboard) comprising character, numeral, space and symbol keys, which are used for correction input of conversation when content (word or sentence) of the vocally recognized conversational text includes an error, or for the input of the supplementary information (year, month, day, place and names, addresses and company names of speakers) of the conversational text.

Numeral 208 denotes an OK key ("OK") used in directing to translate a conversational text which has been vocally recognized and displayed in case the contents thereof include no errors.

Numeral 209 denotes a correction key ("COR") for directing and setting the correction mode when it is necessary to correct or supplement the conversational text which has been vocally recognized or the conversational text which is stored.

Numeral 210 denotes a switch key (Exchange, "EXC") used in switching the input language and the output language of the first language and the second language which have been set.

Although the invention is provided with a function of automatically switching the languages which are set for the first language and the second language every time a conversational text is translated, this switching key 210 is used when it is desired to intentionally switch the contents of the first language dictionary and the second language.

Numeral 211 denotes a menu key ("MEN") used to get menu screen for the selection of various functions or mode.

Numeral 212 denotes a delete key (Delete, "DEL") to delete a portion indicated by a cursor when correcting a sentence which is displayed.

Numeral 213 denotes an insert key ("INS") for inserting a word or sentence at a position before the portion indicated by the cursor when correcting a sentence.

Numeral 214 denotes an assertion key (Enter, "ENT") used in directing the end of voice input or directing the end of correction of a sentence.

Numeral 215 denotes up, down, left and right cursor keys ("↑", "↓", "←", "→") used to scroll up and down the display when a text is displayed or when correcting a text, and move the cursor position upward, downward, leftward and rightward.

Numeral 216 denotes keys for other functions which are not mentioned in this embodiment.

Figure 3:
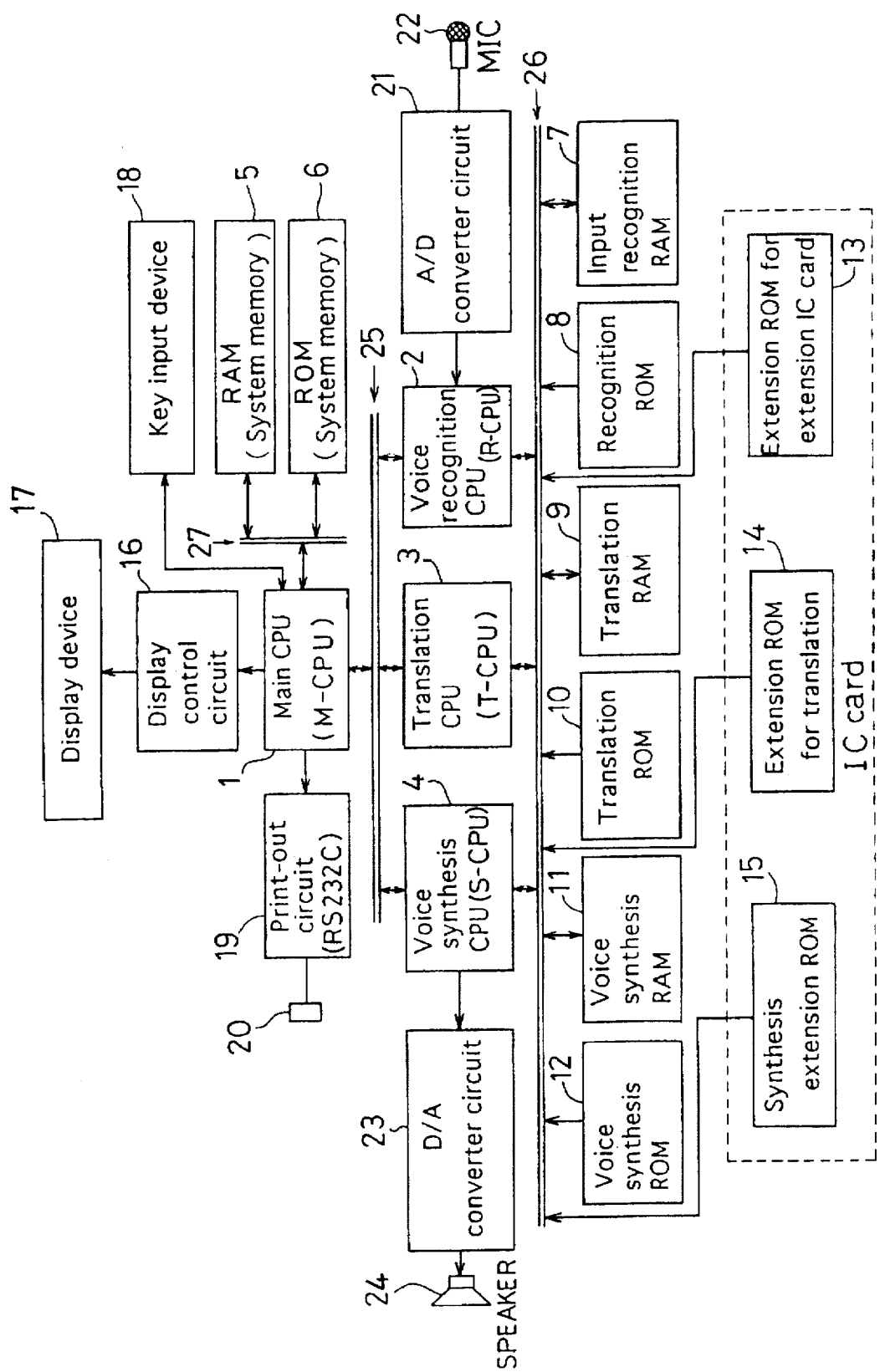
FIG. 3 is a block diagram showing the hardware system of the electronic interpreting machine of the invention.

FIG. 3 is a block diagram showing the hardware system of the electronic interpreting machine of the invention. In FIG. 3, numeral 1 denotes a main CPU (M-CPU) that controls all functions of vocal input, voice recognition, translation, voice synthesis, key input, display output and print-out (carried out by the voice recognition means, translating means, voice information generating means, information volume computing means, computed information notifying means, recognition judging means, recognition message generating means, recognition correcting means, dictionary switching means, printing information generating means, retrieval means, editing means, time setting means and storage control means shown in FIG. 1).

The main CPU 1 is connected via a control bus 25 to sub-CPUs 2, 3, 4, and is also connected via a data bus 27 to system memory (ROM, RAM) 5, 6.

Numeral 5 denotes RAM (system memory) for the main CPU 1 which is used as a work area for controlling the entire system and as a conversational text storing area for storing the entire conversational text. Numeral 6 denotes ROM (system memory) for the main CPU 1 which stores the control programs that control the entire system.

The main CPU 1 is connected to a key input device 18, a display control circuit 16 and a print-out circuit 19. Connected to the display control circuit 16 is a display device comprising LCD (liquid crystal display) 17.

The key input device 18 is a keyboard (key pad) corresponding to the numerals 207 through 216 shown in FIG. 2.

The display control device 16 is constituted of a liquid crystal driver for driving the display device 17 (corresponds to the display device 202 shown in FIG. 2).

The print-out circuit 19 is constituted of a RS232C interface that is, when the entire conversational text stored in the system RAM 5 is to be printed, used to output the text as the printed data.

Numeral 20 denotes a print-out terminal for connecting an external printing device.

Numeral 22 denotes a microphone (voice input device, MIC) for voice input, and numeral 21 denotes an A/D converter circuit that converts the voice input through the microphone 22 to digital signals (vocal data).

Numeral 2 denotes a voice recognition CPU (R-CPU) that takes in vocal data and processes the recognition of the data as conversational text (word, sentence) of the first language, and is connected to the A/D converter circuit 21 to take in the vocal data which has been vocally input.

Numeral 3 denotes a translation CPU (T-CPU) that translates the conversational text (word, sentence) which was recognized the voice recognition CPU 2 into the second language.

Numeral 4 denotes a voice synthesis CPU (S-CPU) that generates voice synthesis data for the vocal output of the words or sentence which has been translated by the translation CPU 3.

The voice recognition CPU 2, the translation CPU 3 and the voice synthesis CPU 4 are connected to a group of memory (RAM, ROM) 7 through 12 via the data bus 26.

The voice synthesis CPU 4 is connected also to a voice output D/A converter circuit 23. The D/A converter circuit 23 is constituted of a D/A converter that converts digital signals of voice data synthesized by the voice synthesis CPU 4 (S-CPU) into analog signals. Numeral 24 denotes a speaker (voice output device, SP) that provides voice output.

Numeral 7 denotes RAM for voice input and voice recognition. Voice data which is input from the A/D converter circuit 21 is once stored in the RAM 7 via the voice recognition CPU 2 and then stored in the RAM 7 again as recognition data recognized by the function of the voice recognition CPU 2.

Numeral 8 denotes ROM for voice recognition which stores the control programs of the voice recognition CPU 2 (R-CPU) and language recognition dictionary data for unspecified speakers.

Numeral 13 denotes ROM for recognition and extension which stores the language recognition dictionary data for unspecified speakers other than dictionary data stored in the ROM 8. Dashed line in the figure indicates an extension IC card.

Numeral 9 denotes a translation RAM. Recognition data stored in the RAM 7 is once taken into the RAM 9, then translation data processed by the translation CPU 3 (T-CPU) is stored again in a specified area of the RAM 9.

Numeral 10 denotes translation ROM which stores control programs of the translation CPU 3 and dictionary data for translation between different languages required for the translation of a language (first language) to another language (second language).

Numeral 14 denotes ROM for translation and extension which stores the dictionary data for translation between languages other than the translation dictionary stored in the ROM 10. The ROM 14 is also housed in the extension IC card similarly to the ROM 13.

Numeral 11 denotes a voice synthesis RAM. Among the translation data stored in the RAM 9, data which should be processed for voice synthesis is taken into the RAM 11, and is then subjected to a specific voice synthesis process by the voice synthesis CPU 4 (S-CPU) to be output as voice data to the D/A converter circuit 23.

Numeral 12 denotes a voice synthesis ROM which stores control programs of the voice synthesis CPU 4, to carry out voice synthesis in Japanese, English or other language, and dictionary data for voice synthesis in different languages.

Numeral 15 denotes a ROM for voice synthesis and extension which stores the dictionary data for extended languages and voice synthesis other than the dictionary data stored in the ROM 12, and is housed in the extension IC card similarly to the ROM 13 and the ROM 14.

Figure 4:
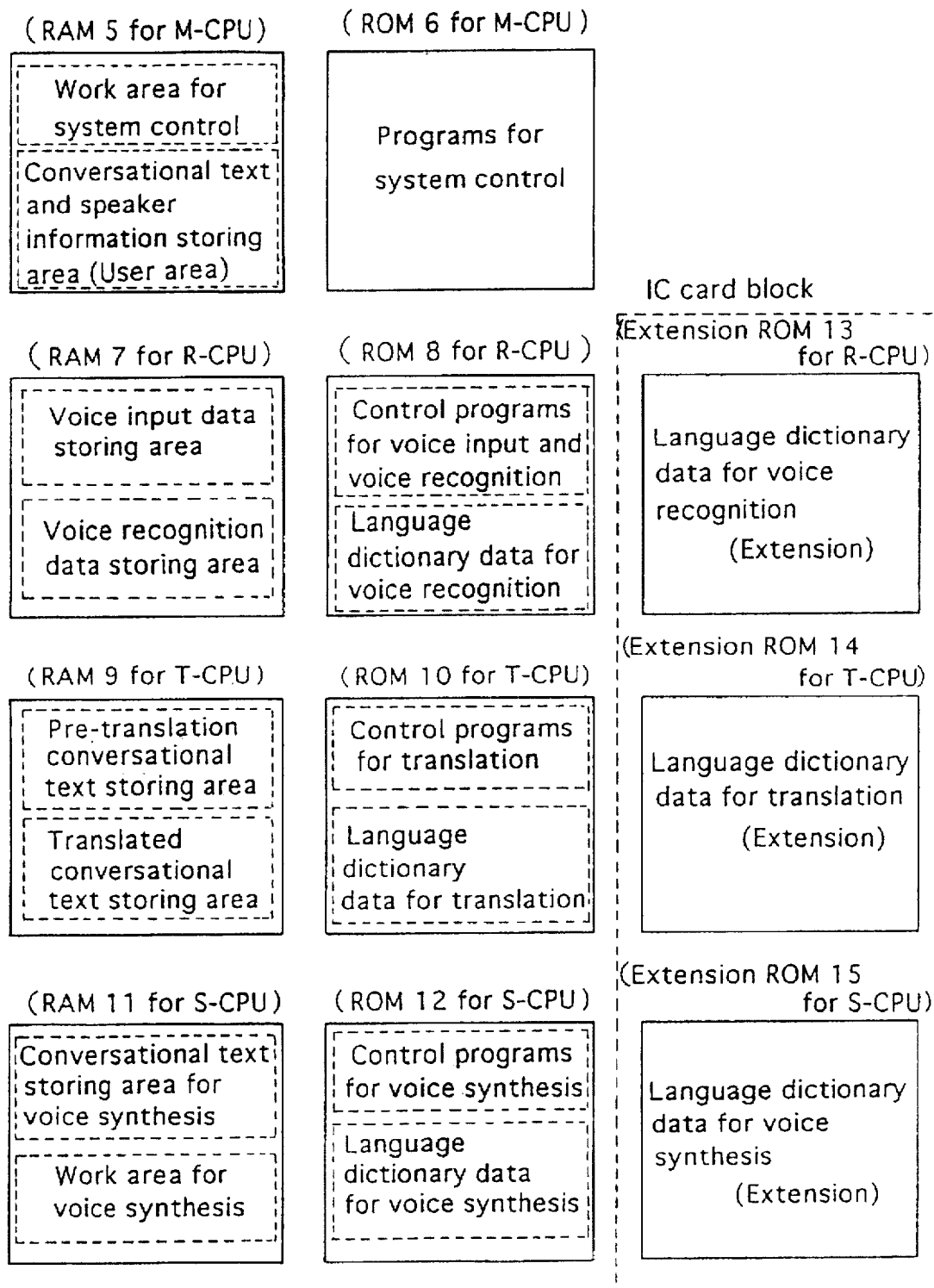
FIG. 4 is an explanatory drawing which shows the allocation of memory used in the hardware system shown in FIG. 3.

FIG. 4 is an explanatory drawing showing the allocation of the memory used in the hardware system shown in FIG. 3. As shown in FIG. 4, the drawing shows the allocation of the RAM 5 (system memory), the RAM 7 (for voice input and voice recognition), the RAM 9 (for translation), the RAM 11 (for voice synthesis), the ROM 6 (system memory), the ROM 8 (for voice recognition), the ROM 10 (for translation), the ROM 12 (for voice synthesis), the ROM 13 (for voice recognition and extension) housed in the extension IC card, the ROM 14 (for translation and extension) and the ROM 15 (for voice synthesis and extension).

Figure 5:
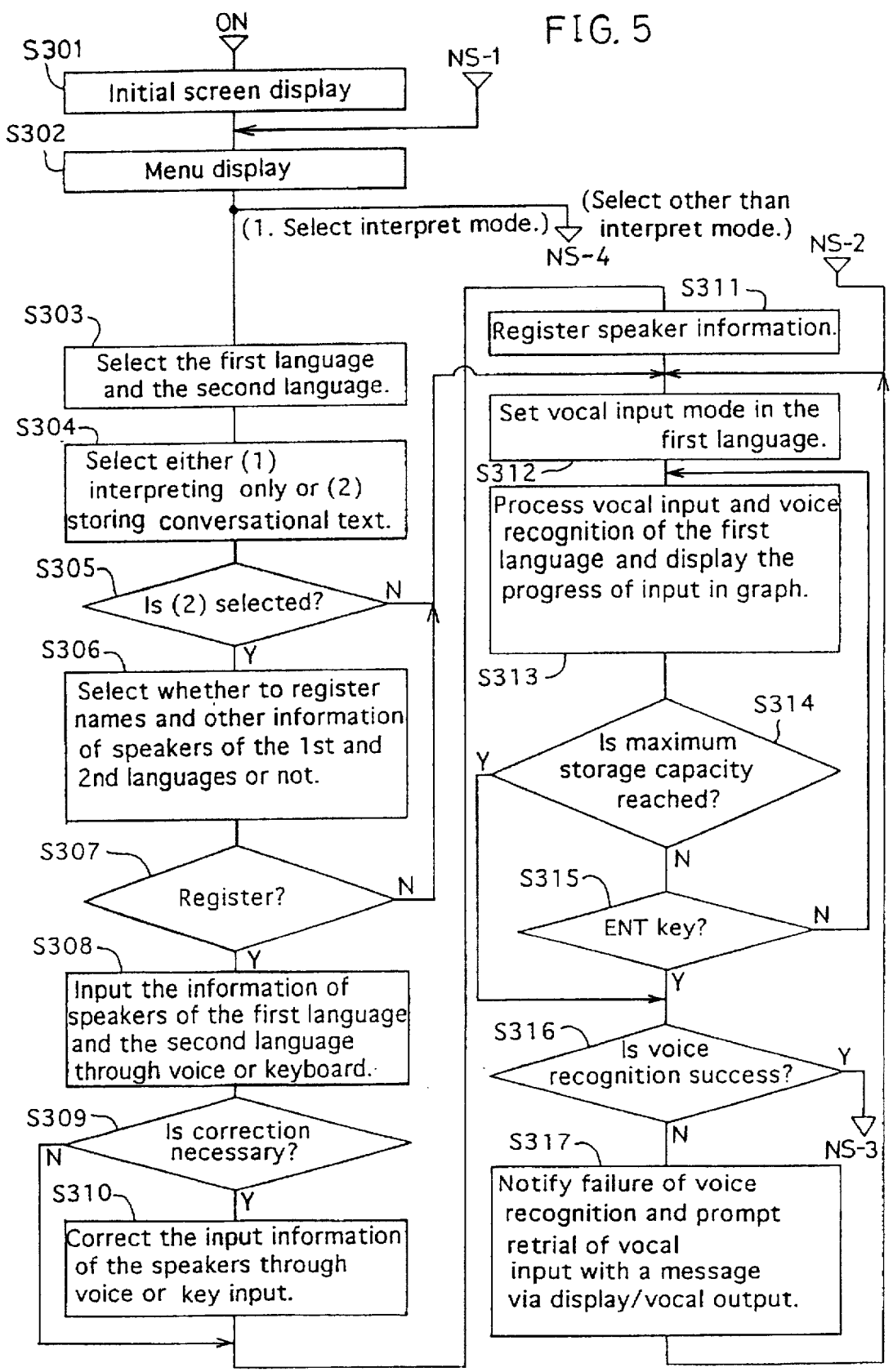
FIG. 5 is an outline flow chart showing processing operation 1 of the electronic translation machine of the invention.
Figure 6:
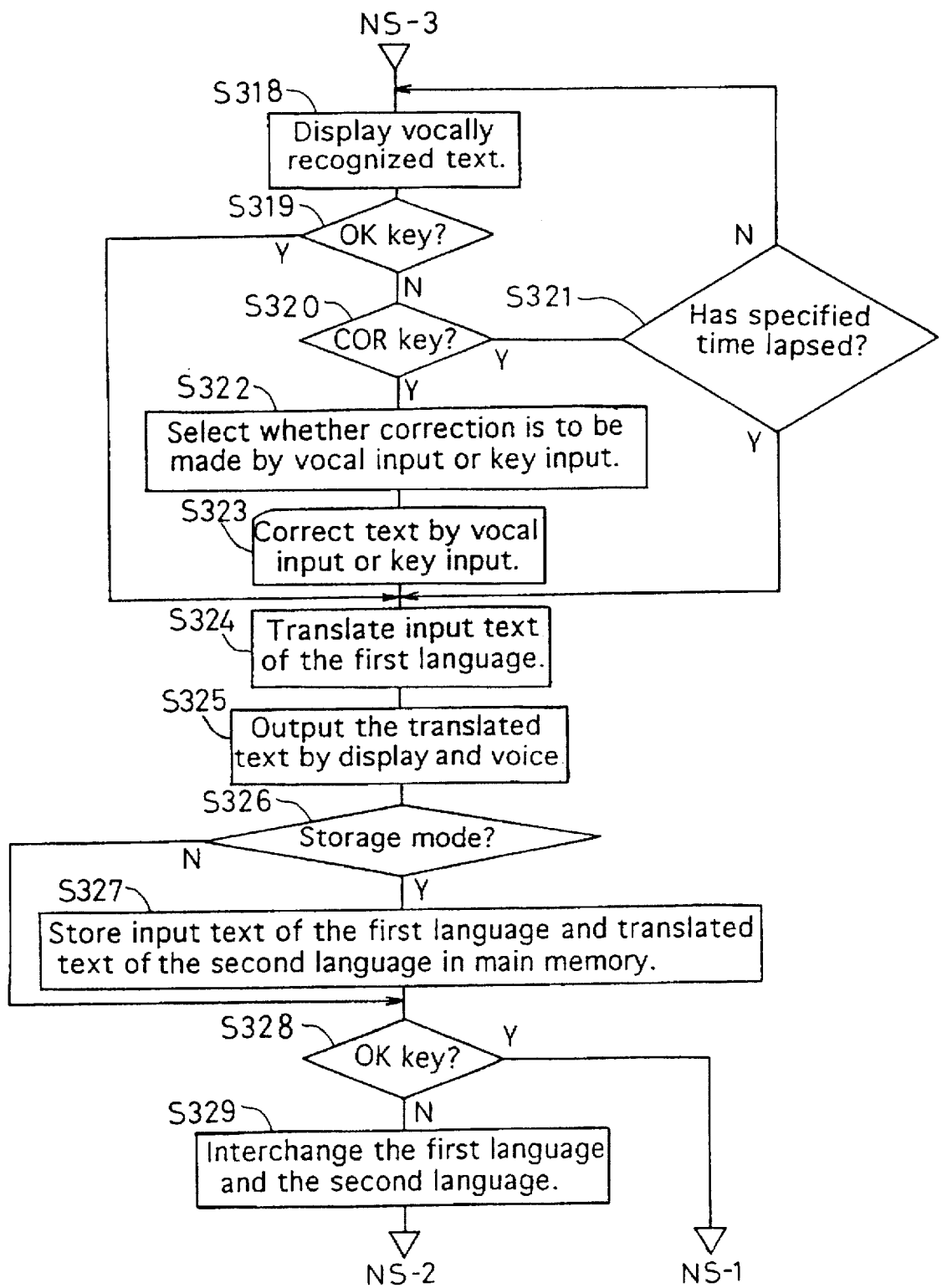
FIG. 6 is an outline flow chart showing processing operation 2 of the electronic translation machine of the invention.
Figure 7:
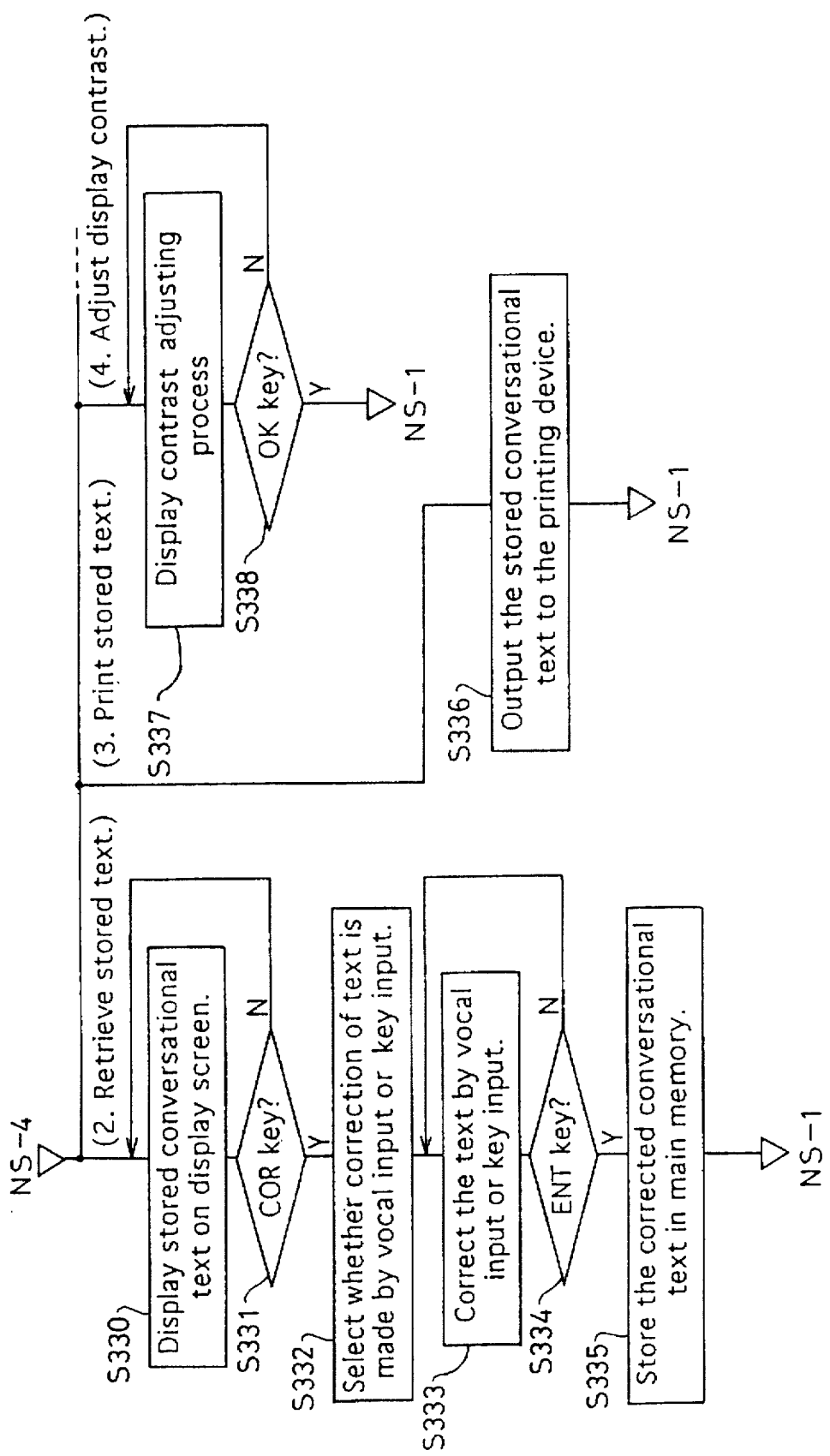
FIG. 7 is an outline flow chart showing processing operation 3 of the electronic translation machine of the invention.

FIG. 5 is an outline flow chart showing the processing operation 1 of the electronic interpreting machine of the invention. FIG. 6 is an outline flow chart showing the processing operation 2 of the electronic interpreting machine of the invention. FIG. 7 is an outline flow chart showing the processing operation 3 of the electronic interpreting machine of the invention. The outline flow chart shown in FIG. 5 will be described below.

The operation starts when the "ON" key shown in FIG. 2 is pressed. When the "ON" key is pressed, the sequence first enters the process of step S301 to display the initial screen, which is indicated by D17-1 of FIG. 17 to be described later, on the liquid crystal display 17 for a predetermined period of time (about 1 to 2 seconds), then executes the process of step S302 to display menu screen shown in D17-2 of FIG. 17.

In step S302, after executing the menu displaying process, the sequence enters a state of waiting for key input to maintain the menu screen displayed until a menu selection key is pressed.

When interpret mode is selected from the menu, the sequence proceeds to step S303 or, when a function (mode) other than the interpret mode is selected, proceeds to branch step NS-4 shown in FIG. 7.

Step S303 is a routine for selecting the first language to be vocally input at the first and the second language which is the translation of the vocally input language and is to be vocally output. When the languages have been selected, the sequence proceeds to step S304.

Step S304 is a routine for selecting, among the interpret mode selected in step S302, either [1] a mode wherein only the interpreting operation is carried out without keeping a record of conversational text, or [2] a mode wherein conversational text exchanged between two languages is interpreted and the entire conversational text is recorded, is selected. The sequence proceeds to step S312 when [1] is selected, or to step S306 when [2] is selected.

Step S306 is a routine to select further, in the storage mode [2] selected in step S304, whether or not to register the supplementary information such as the names, company names and addresses of speakers of the first language and the second language. The sequence proceeds to step S308 when registration is selected, or to step S312 registration is not selected.

Step S308 is a routine for registering the information on the speakers of the first language and the second language through vocal input or key input, when registration mode has been selected in step S306.

Step S309 is a routine to confirm the information of the speaker entered in the step S308 on the display screen and to judge whether the information needs to be corrected or not.

The sequence proceeds to step S310 when the registered information requires correction, or to step S311 when correction is not necessary.

Step S310 is a routine to make correction through vocal input or key input for a portion of the information on the speaker entered in step S308 which requires correction.

Step S311 is an execution routine that registers the information on the speaker that has been entered in step S308 or corrected in step S310

Step S312 is a routine that starts vocal input of conversational text for the language selected in step S303 as the first vocally input language.

Step S313 is a routine that actually processes the voice input. While processing the voice input and voice recognition, the sequence calculates the ratio of memory area occupied to store the input language to the maximum memory area available for vocal input (set value) which is predetermined, and displays the ratio on the screen of the display device in terms of numeral value or graph.

Step S314 is a routine to determine whether the maximum memory area available for vocal input is used up or not. The sequence proceeds to step S316 when the maximum memory area is used up, or otherwise proceeds to step S315.

Step S315 is a routine to determine whether the "ENT" key that indicates the end of vocal input is pressed or not. The sequence proceeds to S316 when the "ENT" key is pressed, or to S313 when "ENT" key is not pressed.

Step S316 is a routine to determine whether vocally input conversational text could be recognized or not, when vocal input is completed in step S314 or S315. The sequence proceeds to step NS-3 of FIG. 6 when the text is recognized, or to step S317 when not recognized.

Step S317 is a routine which, when it was determined in step S316 that the voice input could not be recognized, outputs a recognition message notifying that voice recognition failed and prompting to do over the vocal input to the display device and to the vocal output device.

The outline flow chart shown in FIG. 6 will be described below.

Step S318 is a routine to display the recognized conversational text on the display device when it was determined in step S316 that the voice recognition was success.

Step S319 is a routine to determine whether or not the "OK" key is pressed to the recognized text displayed in step S318. The sequence proceeds to step S324 when the "OK" key is pressed, or to step S320 when the "OK" key is not pressed.

Step S320 is a routine to determine whether the "COR" key for correction of text is pressed or not. The sequence proceeds to step S322 when the "COR" key is pressed, or to step S321 when it is not pressed.

Step S321 is a routine to determine whether a predetermined period of time has lapsed or not after the recognized text was displayed in step S318. The sequence returns to step S318 to continue the display of the recognized text when the predetermined period of time has not lapsed, or proceeds to step S324 by deciding that no correction is required for the recognized text which is output for display when the predetermined period of time has lapsed.

Step S322 is a routine to select whether correction of text is to be done through vocal input or through key input when it is determined that the correction key is pressed for the recognized text in step S320.

Step S323 is a routine to correct the text by the method selected in step S322.

Step S324 is a routine to translate the recognized text (input conversational text) which was established in step S319 or step S321 or step S323, to the second language selected in step S303 of FIG. 5.

Step S325 is a routine to display the conversational text translated in step S324 on the display device and vocally output the text onto the vocal output device by means of voice synthesis process.

Step S326 is a routine to determine whether the mode selected in step S304 of FIG. 5 is storage mode or not. The sequence proceeds to step S327 when it is storage mode, or to step S328 when it is not storage mode.

Step S327 is a routine to store the conversational text which is translated in step S324 in the system memory RAM 5.

In step S328, it is checked whether the OK key indicating the end of conversation between different languages which was started in step S303 of FIG. 5 is pressed or not. The sequence determines that the whole conversation is completed and proceeds to branch step NS-1 of FIG. 5 when the ON key is pressed, or proceeds to step S329 when it is not pressed.

Step S329 is a routine to automatically change the first language and the second language selected in step S303 of FIG. 5 upon completion of the input and translation of one unit of conversation. After this process, the sequence proceeds to branch step NS-2 of FIG. 5 to start the next vocal input (input of conversation).

Now the outline flow chart shown in FIG. 7 will be described below.

Step S330 is a routine which, when retrieval of the stored text is selected in step S302 of FIG. 5, retrieves the entire conversational text stored in the specified memory area of the RAM 5 (system memory) and displays it on the display device.

Step S331 is a routine to determine whether the "COR" key for directing to correct the stored text which is displayed in the above step is pressed or not. The sequence proceeds to step S332 when the "COR" key is pressed, or returns to S330 and continues to display the stored text when the key is not pressed.

Step S332 is a routine to select whether the correction of text is to be made either by vocal input or by key input, similarly to step S322 of FIG. 6.

Step S333 is a routine to carry out the correction of the text by the means selected in step S332.

Step S334 is a routine to determine whether the "ENT" key indicating completion of correcting operation of step S333 is pressed or not. The sequence determines that the correction has been completed and proceeds to step S335 when the "ENT" key is pressed, or returns to S333 and continues the correction mode when the key is not pressed.

Step S335 is a routine to store the text corrected in step S333 in the specified memory area of the system RAM 5. After this process, the sequence returns to the branch step NS-1 of FIG. 5.

Step S336 is a routine for a process required in case printing of the stored text is selected in step S302, and retrieves the conversational text stored in the specified memory area of the system RAM 5 while converting it into the specified print format, and outputs it through the communication terminal 20 which is used for connection of an external printing device. After this process, the sequence returns to the branch step NS-1 of FIG. 5.

Step S337 is a routine for processing in case adjustment of display contrast is selected in step S302.

Step S338 is a routine to determine whether the "OK" key indicating that the adjustment of display contrast has been completed is pressed or not. The sequence determines that the adjustment of display contrast has been completed and returns to the branch step NS-1 of FIG. 5 when the OK key is pressed, or returns to step S337 and continues the process of display contrast adjustment when the key is not pressed.

Outline of the processes of the electronic interpreting machine of the invention has been described above. Now the preferred embodiments 1 through 7 of the invention will be described in detail below.

Embodiment 1

Figure 8:
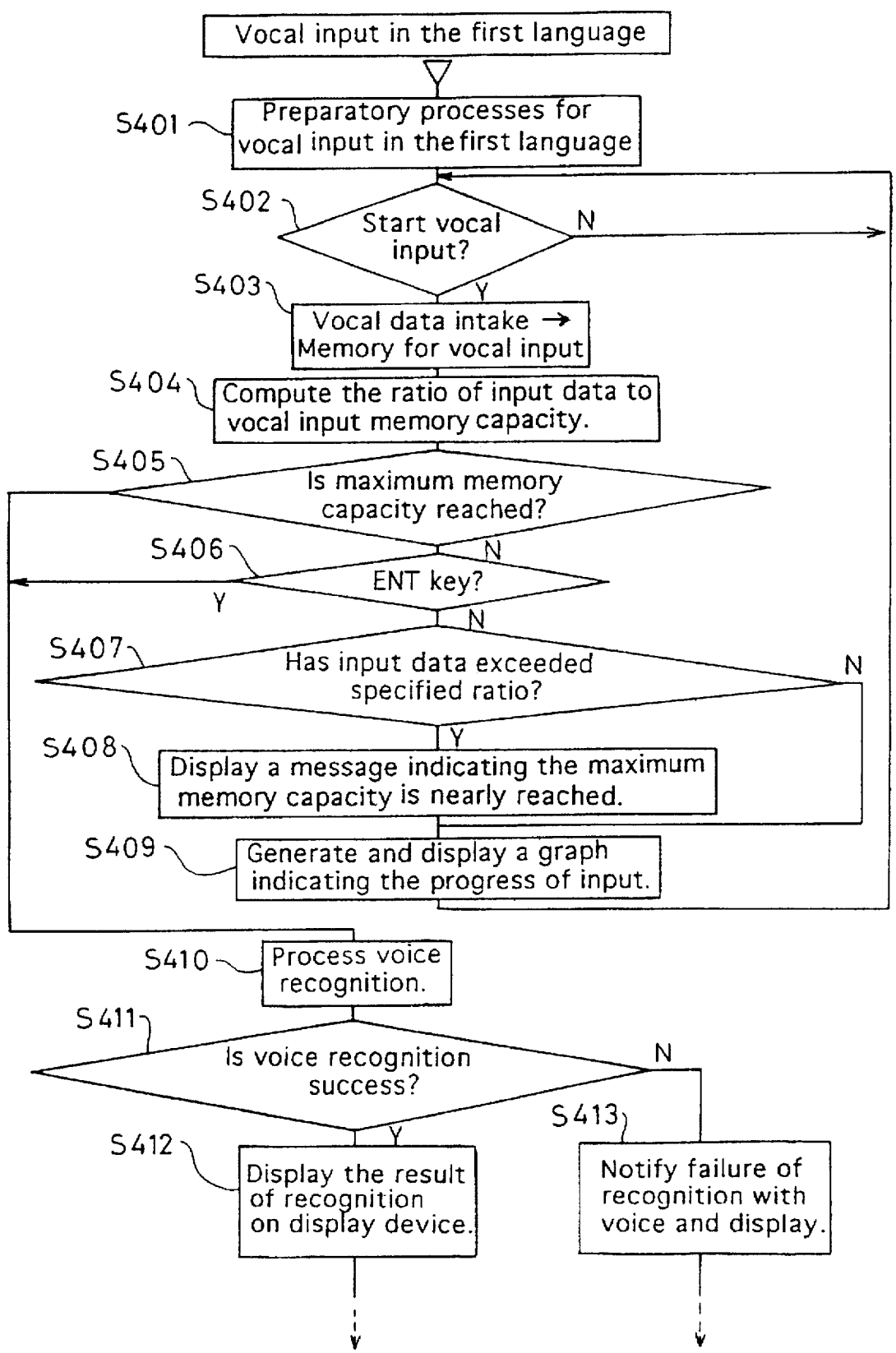
FIG. 8 is a flow chart showing processing operations of the first embodiment and the second embodiment of the invention.

FIG. 8 is a flow chart showing the processes in the first embodiment and the second embodiment of the invention.

FIG. 8 is a flow chart that shows the processes from step to step S317 of the outline flow chart of FIG. 5 in detail.

The first embodiment will be described below with reference to the flow chart of FIG. 8.

Step S401 is a routine to make preparations such as setting of various flags and address pointers for memory areas, in order to store vocal data (digital data) obtained by applying A/D conversion to input vocal data in the vocal input data storing area indicated by RAM 7 (for vocal input, voice recognition) of FIG. 4.

Step S402 is a routine to detect a rise of vocal input data which is input through the microphone 22 shown in FIG. 3. Although the sequence remains idle in the routine of step S402 until vocal input is detected, proceeds to step S403 and starts to take in the vocal input data when a rise of the vocal input is detected.

Step S403 is a routine to store vocal data which is input via the A/D conversion circuit 21 of FIG. 3 in the vocal data storing area of the RAM 7 (for vocal input, voice recognition) shown in FIG. 3 and FIG. 4 via the voice recognition CPU 2 of FIG. 3.

Step S404 is a routine to compute the ratio of the memory area which has been used to store the input vocal data in step S403 to the maximum vocal input data storing capacity in percentage.

Step S405 is a routine to determine whether the ratio computed in step S404 has reached 100% or not. In case of YES (reached 100%), the sequence automatically ends the state of vocal input and proceeds to step S410. In case of NO (below 100%), the sequence proceeds to step S406.

Step S406 is a routine to determine whether the "ENT" key is pressed or not. In case of YES ("ENT" key is pressed), the sequence determines that the speaker has completed the input and proceeds to step S410. In case of NO ("ENT" key is not pressed), the sequence determines that the vocal input will be continued and proceeds to step S407.

Step S407 is a routine determine whether the rate of the memory area which has been used to store the vocal data which was computed in step S404 has reached a predetermined value (for example, 85%) or not. In case of YES (not less than the predetermined ratio), the sequence proceeds to step S408 to display a warning message notifying that the vocal data stored is approaching the maximum available. In case of NO (below the predetermined ratio), the sequence proceeds to step S409.

Step S408 is a routine which, when the ratio has reached the predetermined value (for example, 85%) in step S407, outputs the warning message to the display device.

Step S409 is a routine to output the memory ratio calculated in step S404 onto the display device in the form of a graph.

Step S410 is a routine to carry out voice recognition process on the vocal data stored in the vocal input data storing area after completing the voice input of one unit.

Step S411 is a routine to determine whether the voice recognition carried out in step S410 is success or not. The sequence proceeds to step S412 in case of YES (success), or to step S413 in case of failure.

FIG. 9 is an explanatory drawing showing an example of screen display related to the first embodiment. The drawing shows an example of display screen when vocal input is made according to the process of FIG. 8.

D9-1 shows in initial screen before starting the vocal input, and D9-2 through D9-4 show screens displayed when vocal input is under way. Bar graph shown at the bottom of the example of display screen is the graph indicating the ratio of memory used to store the voice input, which was described in relation to step S409 of FIG. 8, showing the ratio changing as the vocal input proceeds.

D9-5 shows a warning message displayed to notify that the vocal data stored has exceeded the predetermined proportion of the maximum storage capacity according to the processes described in conjunction with step S407 and step S408 of FIG. 8.

Thus according to the first embodiment, progress of the vocal input of the first language is displayed in the form of graph to notify the speaker in real time. This enables the speaker to place pauses as required during vocal input by checking the progress of the input, so as to avoid such a situation that the conversational text is interrupted amid a phrase, thereby preventing mis-interpretation.

Embodiment 2

Now the second embodiment will be described below with reference to the flow chart of FIG. 8.

Step S411 is a routine to determine whether voice recognition of the vocal input data is success or failure. In case of YES (success), the sequence outputs the result of voice recognition onto the display device to prompt the speaker to confirm. In case of NO (failure), the sequence gives an output indicating that the voice recognition is a failure to both the display device and the voice output device, to prompt the speaker to do over the vocal input.

FIG. 10 is an explanatory drawing showing an example of screen display related to the second embodiment. The drawing shows examples of display output and vocal output of each message in case the first language is Japanese or English, when the recognition failed.

According to the second embodiment, when the first language which has been vocally input could not be correctly recognized, a message that notifies that the voice recognition failed and prompts the speaker to make accurate vocal input is output in the form of display and voice. Thus preparation is made for retrial of vocal input with accurate pronunciation, and therefore the speaker can continue correct conversation.

Embodiment 3

Figure 11:
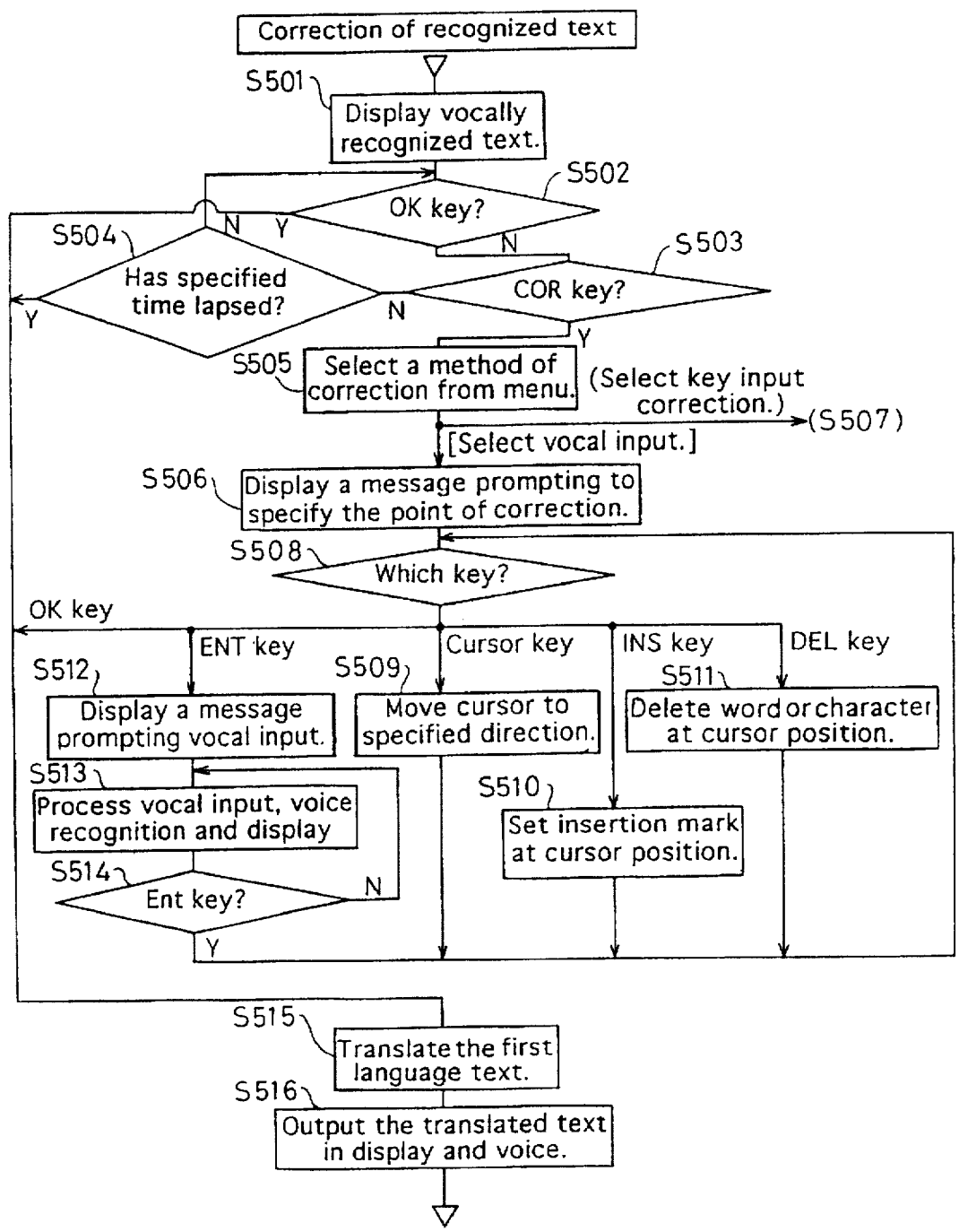
FIG. 11 is a flow chart showing processing operation of the third embodiment of the invention.

FIG. 11 is a flow chart showing the processing operation in the third embodiment of the invention. FIG. 11 is a flow chart showing the processing operations from step S318 to step S325 in the outline flow chart shown in FIG. 6.

FIG. 12 is an explanatory drawing showing key operation and an example of screen display related to the third embodiment.

Now the third embodiment will be described below with reference to the flow chart of FIG. 11.

Step S501 is a routine to output the vocally recognized text on the display screen and prompt the speaker to confirm, similarly to step S318 in the outline flow chart of FIG. 6.

Step S502 is a routine to determine whether or not the "OK" key is pressed to the text displayed in step S501. The sequence determines that the recognition is correct and proceeds to step S515 in the case of YES ("OK" key is pressed), or to step S503 to determine whether the "COR" key (correction key) is pressed in the case of NO (OK key is not pressed).

Step S503 is a routine to determine whether the "COR" key is pressed or not, as described above. The sequence proceeds to step S505 in the case of YES ("COR" key is pressed), or to step S504 in the case of NO ("COR" key is not pressed).

Step S504 is a routine to count the time lapse when neither the "OK" key nor the "COR" key was pressed. When a predetermined period of time (for example, 30 seconds) has lapsed, namely in case of YES, the sequence determines that the recognized text was confirmed and proceeds to step S515. When the predetermined period of time has not lapsed, namely in the case of NO, the sequence proceeds to step S502 to detect the operation of "OK" key or "COR" key again.

Step S505 is a menu screen processing routine for selecting the method of correction when the "COR" key has been pressed. The sequence displays the menu screen shown in D12-3 in FIG. 12 to be described later and proceeds to step S506 in case vocal input of [1] is selected in this screen, or to step S507 in case key input of [2] is selected.

Step S506 outputs a message prompting to specify the portion to be corrected as indicated by D12-4 in FIG. 12 to be described later, then proceeds to step S508 which is a key identification routine for detecting the operation of the cursor keys ("←", "→"), "OK" key, "ENT" key, "INS" key and "DEL" key.

In step S508, when the operation of any of the above five keys is detected, the sequence proceeds to the corresponding one of sequences S509, S510, S511, S512 and S515 to carry out the specified operation.

Step S509 is a routine for the process required when the leftward or rightward cursor key is pressed. The sequence moves the cursor to the direction (leftward or rightward) indicated by the key and returns to step S508.

Step S510 is a routine for the process required when the "INS" key (insert key) is pressed. The sequence inserts an insertion mark (refer to D12-7 of FIG. 12) at the current cursor position and returns to step S508.

Step S511 is a routine for the process required when the "DEL" key (delete key) is pressed. The sequence deletes the word or character indicated by the current cursor position and returns to step S508.

Step S512 is a routine that prepares for vocal input to input a new word or sentence at the position specified by the cursor key, the "INS" key, the "DEL" key, etc. The sequence displays a message to prompt vocal input and returns to step S513.

Step S513 is a routine to recognize vocally input voice data and displays it at the cursor position. The sequence repeats this process until operation of the "ENT" key that indicates the end of vocal input is detected.

Step S514 is a routine to detect the operation of the "ENT" key that indicates the completion of vocal input. The sequence proceeds to step S508 in the case of YES ("ENT" key is pressed), or returns to step S513 and continues the necessary process in the case of NO ("ENT" key is not pressed).

In case operation of the "OK" key is detected in step S508, the sequence determines that correction (deletion, insertion, addition) of the recognized text has been completed and proceeds to step S515.

Step S515 is a routine to translate the vocally recognized text of the first language, that has been confirmed by the speaker in the above process, into the second language. Upon completion of translation, the sequence proceeds to step S516.

In step S516, the text of the second language translated in step S515 is displayed on the display device and is output to the vocal output device.

While step S507 is a routine for the process required when correction by key input is selected in step S505, other processes are basically the same as those of the case of vocal input, except that the vocal input processes in steps S512 through S514 are replaced with input processes with character keys, and therefore detailed description of the processes will be omitted.

FIG. 12 describes the key operation and examples of display screens related to the third embodiment, in terms of specific key operations, display screens and vocal outputs indicating the processes of correcting the recognized text which were explained with reference to FIG. 11. Now the processes will be described in order.

D12-1 shows a screen displayed during vocal input. D12-2 is a screen wherein the vocally recognized text is displayed upon direction of the end of vocal input by means of the "ENT" key, and it is prompted to answer whether the recognized text can be accepted as it is, or not.

D12-3 is a screen that prompts the selection of correction method upon pressing of the "COR" key. The sequence enters the correction mode when the numeral key "1" is pressed in D12-4.

D 12-5 is a screen where the cursor is moved to the desired correcting position with the right cursor key (→). D12-6 shows an operation of deleting an unnecessary character with the "DEL" key.

D12-7 is a screen wherein the insertion mark is inserted at the cursor position by means of the "INS" key. D12-8 shows a screen where vocal input for correction is started with the "ENT" key.

D12-9 is a screen displayed during vocal input. D12-10 is a screen wherein characters for which vocal input and recognition were completed by pressing the "ENT" key are displayed at the insertion mark on the screen.

D12-11 and D12-12 show the operations of giving an output of the text which was translated into the second language to both the display device and the vocal output device, after the vocally input and recognized characters have been confirmed by the "OK" key.

According to the third embodiment, in case a word or sentence of the conversational text which has been vocally recognized includes an error, the erroneous word or sentence can be corrected either by vocal input or key input, and therefore correct conversation can be continued.

Embodiment 4

Forth embodiment will now be described below with reference to the flow chart of FIG. 6 and examples of screen display of FIG. 12.

Step S328 of FIG. 6 is, as described in the paragraph of outline of operation, a routine to determine whether the "OK" key indicating the end of conversation between the first language and the second language is pressed or not, after translation of one unit of text (from the first language to the second language). In the case of YES ("OK" key is pressed), the sequence returns to the initial state of the electronic translation machine.

In the case of NO ("OK" key is not pressed), on the other hand, the sequence determines that the conversation will be continued further and proceeds to step S329 where the first language and the second language are automatically interchanged and the sequence proceeds to the branch step NS-2. An example of screen display at this time is shown in D12-13 of FIG. 12.

According to the forth embodiment, because translation is carried out while automatically switching the language which is set as the first language or the second language and the dictionary thereof every time the conversational text of the first language which has been vocally input is translated into the second language and is output, the speaker is relieved of the tedious key operations of specifying the first language and the second language, making it possible to continue the conversation between different languages smoothly.

Embodiment 5

The fifth embodiment will be described below with reference to the outline flow charts of FIG. 5, FIG. 6 and FIG. 7. In the fifth embodiment, FIG. 14, FIG. 17 and FIG. 18 will be referred to with regard to the key operations and FIG. 19 will be referred to for an example of print-out of stored conversational text.

While it has been already described that it is selected whether to store the conversational text or not in step S304 of FIG. 5, in case storage mode is selected here, input text in the first language and the translated text in the second language are stored as a set in the specified memory area of the RAM 5 (system memory) of FIG. 2 in step S326 and step S327 of FIG. 6.

In case printing of stored text [3] is selected on the main menu screen (FIG. 17, D17-2) shown in step S302 of FIG. 5, the sequence proceeds to step S336 of FIG. 7 where the conversational text which has been stored is output to an externally connected printing device via the print-out circuit 19 (RS232C interface) and the print-out terminal 20 shown in FIG. 3.

Examples of key operation for the selection of storage mode are shown in D17-5 and D17-6 of FIG. 17 to be described later, and examples of key operation for printing the stored text are shown in D14-9 through D14-11 of FIG. 14. Description of FIG. 14, FIG. 17 and FIG. 18 will be given later, and detailed description will be omitted here.

FIG. 19 is an explanatory drawing showing an example of printout of the stored text. In FIG. 19, the date and time printed on top right are the date and time when input and translation of the conversational text were started that were automatically registered and stored by a clock function (timer) which is built in the main body of the electronic translation machine.

According to the fifth embodiment, it is possible to store the entire conversational text exchanged between the first language and the second language in the specified storage area upon storage direction, convert the entire conversational text which has been stored to the specified print format and print it out upon print direction.

Embodiment 6

Figure 13:
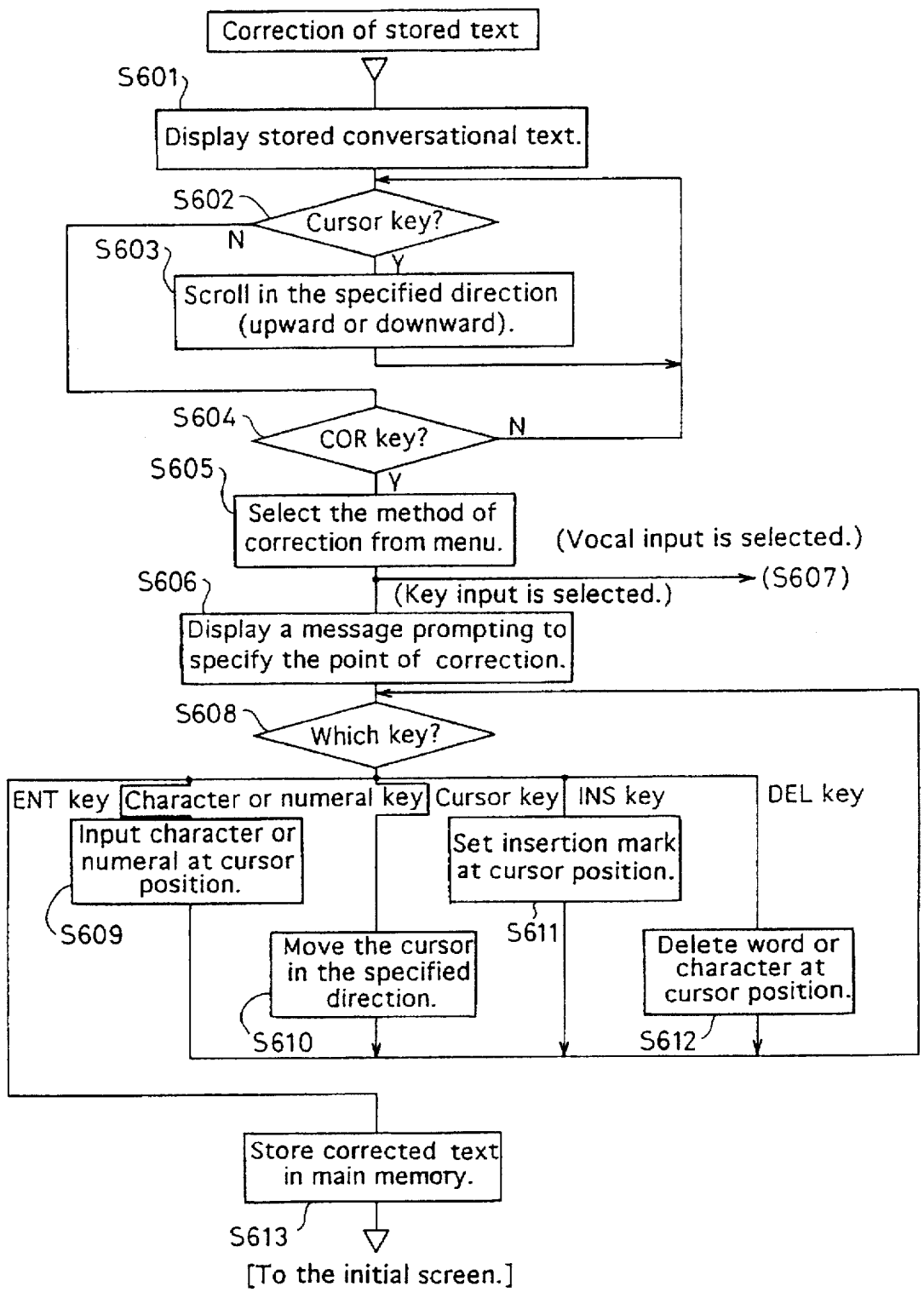
FIG. 13 is a flow chart showing processing operation of the sixth embodiment of the invention.

FIG. 13 is a flow chart showing the processes in the sixth embodiment of the invention. FIG. 13 is a flow chart showing in detail the steps S330 through S335 of the outline flow chart of FIG. 7.

FIG. 14 is an explanatory drawing showing examples of key operation and screen display related to the sixth embodiment.

Now the sixth embodiment will be described below with reference to FIG. 13.

Step S601 is a routine to retrieve the text stored in the main memory and output it onto the display device, after selecting retrieval of the stored text from the initial menu screen shown in step S302 of FIG. 5.

Step S602 is a routine to determine whether the upward or downward cursor key ("↑", "↓") has been pressed while the stored text is displayed. The sequence proceeds to step S603 in the case of YES (cursor key is pressed) to scroll the screen display line by line according to the key input (upward in case of "↑", downward in case of "↓") and returns to step S602. In the case of NO (cursor key is not pressed), the sequence proceeds to step S604 to determine whether the "COR" key is pressed or not.

In step S604, the sequence proceeds to step S605 in case the decision is YES ("COR" key is pressed), or to step S602 and continues the process described above in the of NO ("COR" key is not pressed).

Step S605 is a menu screen where it is selected whether to correct the stored text by vocal input or key input. The sequence proceeds to step S606 when key input is selected, or to step S607 when vocal input is selected.

Step S606 is a routine to provide a screen for text correction while displaying a message prompting to specify the position to be corrected as shown in D14-5 of FIG. 14 to be described later. In the next step S608, the key pressed for correction is identified.

In step S608, the sequence proceeds to step S609 when operation of a character or numeral key is detected, to step S610 when the operation of cursor key is detected, to step S611 when the operation of the "INS" key is detected, to step S612 when the operation of the "DEL" key is pressed, or to step S613 when the operation of the "ENT" key is detected.

In step S610, the cursor is moved up, down, to the left or to the right depending on the cursor key ("↑", "↓", "←", "→") which has been pressed.

Step S609 is a routine where the character corresponding to the character key ("A" to "Z") which has been pressed is input at the cursor position of the screen as an alphabetic character or after being converted to a Japanese character or a Chinese character by the Romanized to Japanese/Chinese character conversion function or, in the case of a numeral key, as a numeral figure.

Step S611 is a routine to input the insertion mark at the cursor position on the screen. Step S612 is a routine to delete a word or sentence at the cursor position on the screen.

In steps S609 through S612, the sequence returns to step S608 after the above processes have been completed, and key judgment and the corresponding processes are repeated.

In case operation of the "ENT" key is detected in step S608, the sequence determines that correction of the stored text has been completed and proceeds to step S613 where the displayed text is stored in the RAM 5 (system memory) of FIG. 2 again and returns to the initial screen processing routine of FIG. 5. Processes carried out in step S607 are basically the same as those of steps S506 through S514 of FIG. 11, and therefore description thereof will be omitted.

Examples of key operation of FIG. 14 will be described below. In FIG. 14, D14-1 is function selection menu screen that first appears. D14-2 is a screen where stored text is retrieved. D14-3 and D14-4 are screens where the displayed information (stored text) is scrolled down by using the downward (↓) on the retrieval screen.

D14-5 is a screen where correction mode for stored text is selected with the "COR" key. D14-6 is a screen where the first word "Konnichiwa" indicated by the cursor is being deleted with the "DEL" key.

D14-7 is a screen where words indicated by the cursor are deleted one after another by successive operations of the "DEL" key.

D14-8 is a screen where the corrected text is stored again in the RAM 5 (system memory) of FIG. 2 by pressing the "ENT" key upon completion of the intended correction of the text.

After displaying the stored text for a specified period of time in D14-8, the screen automatically returns to the initial screen of D14-9.

D14-10 is a screen which is displayed when the stored text print function of [3] is selected on the initial display screen of D14-9. When the printing is completed, the display returns to the initial screen again to show the function selection menu as shown in D14-11.

FIG. 19 shows an example of print-out of the stored text shown in D14-9. The portion indicated by dashed line in FIG. 19 shows a text translated by the electronic interpreting machine of the invention.

According to the sixth embodiment, conversational text stored in the specified memory area can be retrieved onto the screen and edited for deletion, addition, correction, etc.

Embodiment 7

Figure 15:
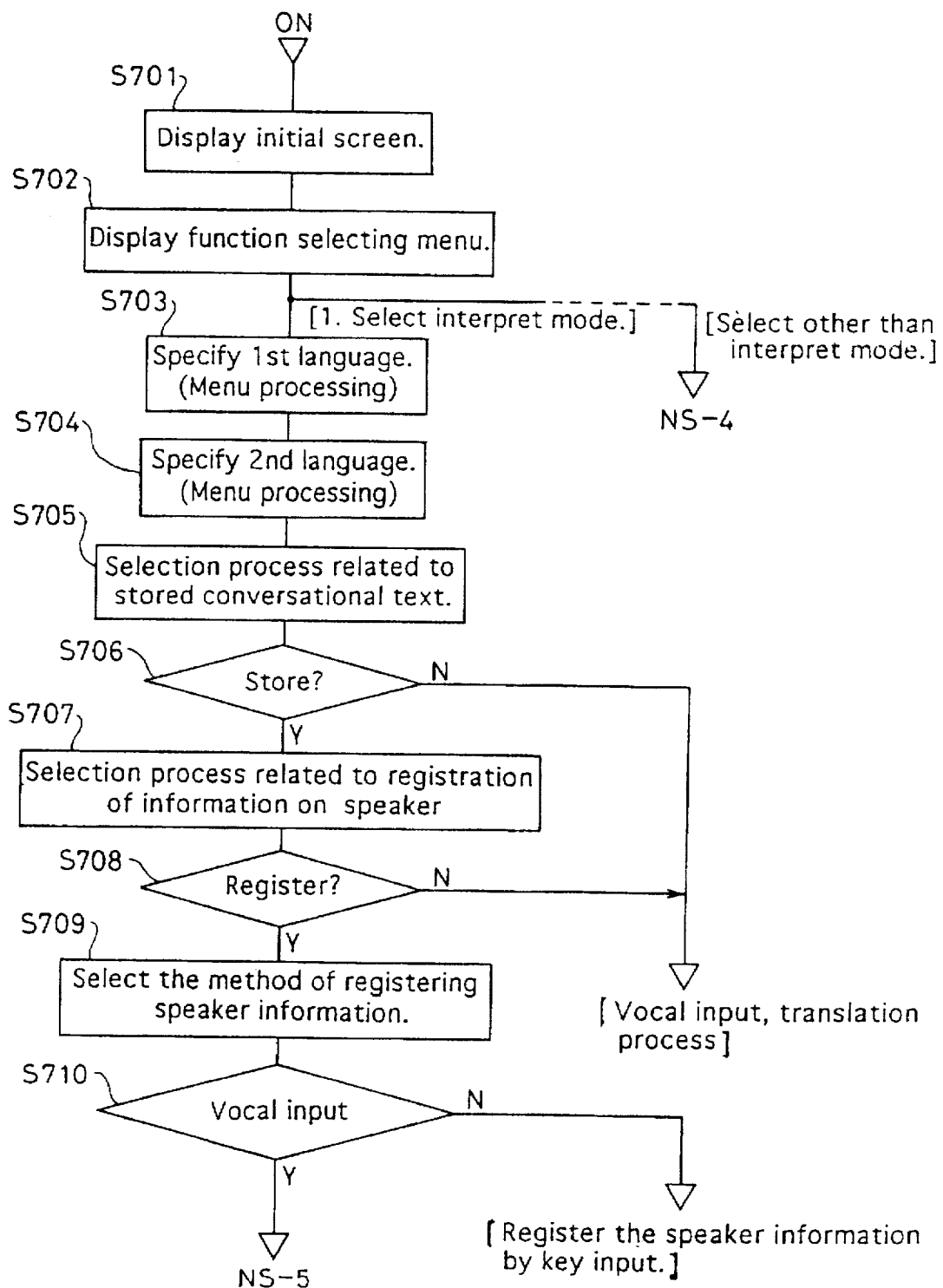
FIG. 15 is a flow chart showing processing operation 1 of the seventh embodiment of the invention.
Figure 16:
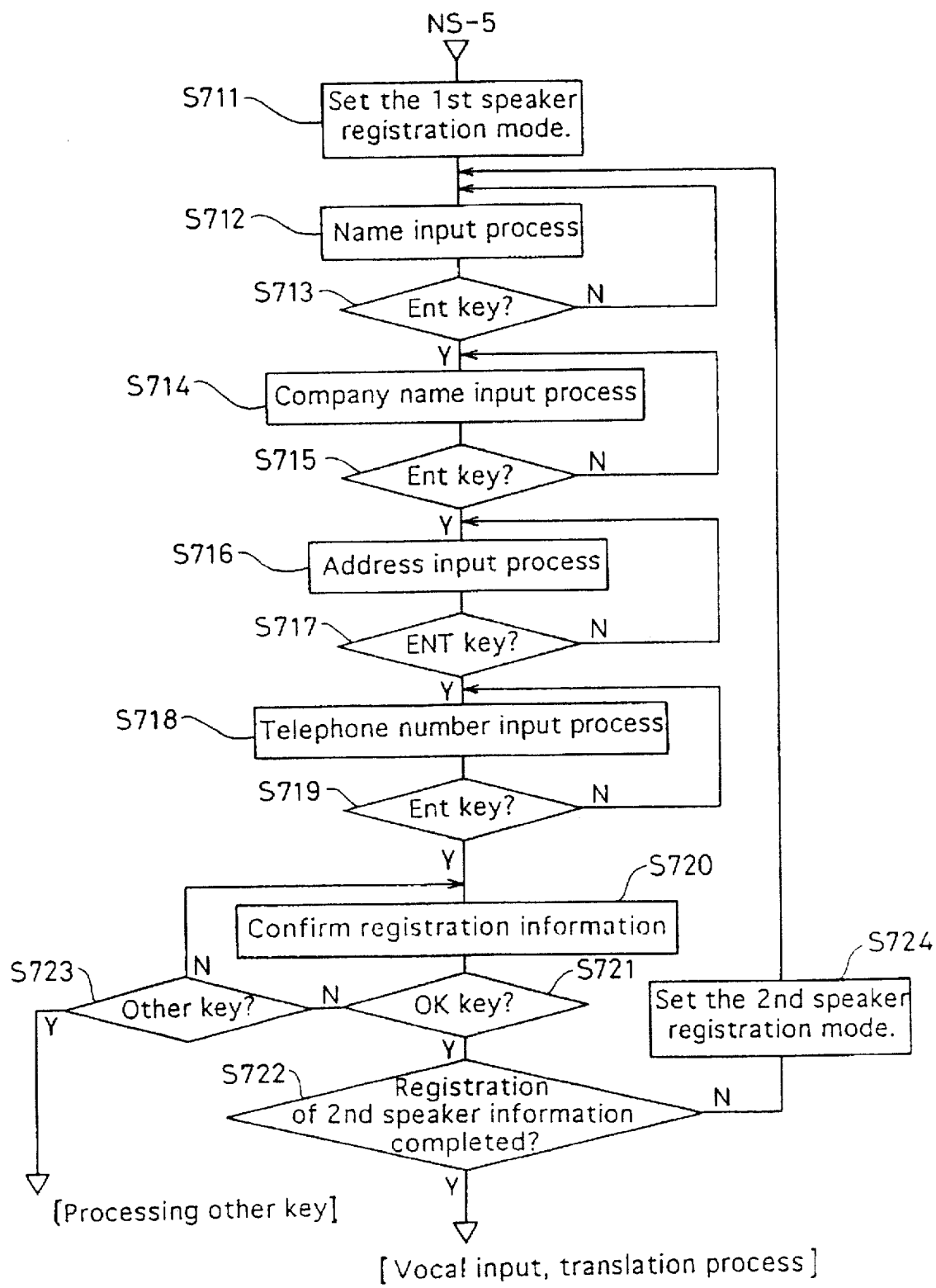
FIG. 16 is a flow chart showing processing operation 2 of the seventh embodiment of the invention.

FIG. 15 shows a flow chart indicating the processing operation (1) of the seventh embodiment of the invention. FIG. 16 shows a flow chart indicating the processing operation (2) of the seventh embodiment of the invention.

The processing operation (1) of the seventh embodiment will be described below with reference to the flow chart of FIG. 15.

Steps S701 and S702 are the same as step S301 and step S302 of FIG. 5, and display the initial screen of the electronic interpreting machine and the menu screen for the selection of function.

In step S702, the sequence proceeds to S703 when interpret mode is selected, or to the branch step NS-4 shown in FIG. 7 when a function other than the interpret mode is selected.

Step S703 is a routine to display the menu for setting the first language in which vocal input is to be made, and to process the setting of the first language.

Step S704 is a routine to display the menu for selecting the second language to which vocal input is to be translated, and to process the setting of the second language.

Step S705 is a routine to process the selection menu screen related to storing of conversational text. The sequence proceeds to step S707 when the result of judgment for storage mode in step S706 is YES (storage mode), or step S312 in FIG. 5 which is a routine to process the vocal input and translation when the result is NO (interpret only), while detailed description will be omitted here.

Step S707 is a routine to process the selection menu screen where it is selected whether information on speakers of the first language and the second language is to be registered or not. The sequence proceeds to step S709 when YES (go registration) is selected in a decision routine shown in step S708, or to the vocal input and translation process routine similarly to the step S706 when NO (no registration) is selected.

Step S709 is a routine to process the menu screen for selecting whether registration of the information on speakers is to be done by vocal input or key input. The sequence proceeds to branch step NS-5 shown in FIG. 16 when YES (vocal input) is selected in the decision routine of step S710, or to the process of speaker information registration by key input when NO (key input) is selected, while description thereof will be omitted because process for key input is basically similar to that of vocal input.

The processing operation (2) of the seventh embodiment will be described below with reference to the flow chart of FIG. 16. Step S711 is a routine to prepare for the registration of the first speaker. After completing the necessary processes in this step, the sequence proceeds to step S712.

Step S712 is a routine to make vocal input of the name among the information on the speaker. Process of this step is repeated until operation of the "ENT" key is detected in the decision routine of step S713. (The "ENT" key is the key which is pressed when vocal input of the name is completed.)

In the case of YES ("ENT" key is pressed) in step S713, the sequence proceeds to the next step S714 to process the input of company name.

Processes that follow are carried out in a procedure basically similar to that of the input of the name. Company name is input in step S714 and step S715, address is input in step S716 and step S717, and telephone number is input in step S718 and step S719, then the sequence proceeds to step S720 where the information (name, company name, address and telephone number) which has been input in the above steps is confirmed and processed.

Then in OK key detection routine of step S721, the sequence determines that registration of the information on the first speaker is completed and proceeds to step S722 in the case of YES ("OK" key is pressed), or to step S723 in the case of NO ("OK" key is not pressed).

Step S722 is a routine to determine whether registration of information on the second speaker is completed or not. The sequence proceeds to the vocal input and translation processing routine of conversational text in the case of YES, or carries out the preparation for the registration of information on the second speaker in step S724 and then returns to step S712 to continue the speaker information input process.

Step S723 is a routine to detect operation of keys other than OK key. The sequence proceeds to a routine of a process that corresponds to the detected key in the case of YES (other key is pressed), or to step S720 to continue the confirmation screen in the case of NO (other key is not pressed).

FIG. 17 is a drawing showing an example of key operation and example 1 of screen display related to the seventh embodiment. FIG. 18 is a drawing showing an example of key operation and example 2 of screen display related to the seventh embodiment.

Examples of key operation shown in FIG. 17 and FIG. 18 will be described below.

D17-1 is the initial screen (displayed for a specified period of time) of the electronic interpret machine. D17-2 shows the function selection menu screen. D17-3 shows the selection of interpret mode. D17-4 shows the selection of Japanese as the first language and D17-5 shows the selection of English as the second language.

D17-9 through D17-12 show the processes of vocal input of the name, company name, address and telephone number of the first speaker. When the "ENT" key is pressed after entering the telephone number in D17-12, the screen changes to first speaker information registration mode.

D17-14 through D17-17 show the processes of vocal input of the name, company name, address and telephone number of the second speaker. After confirming all the information in D17-18, registration of the information on the second speaker is completed by pressing the "OK" key in D17-19, and input of the conversational text is established.

According to the seventh embodiment, it is made possible to set the inputs of date and place of conversation, name, address and company of the speaker and other supplementary information and store them when storing the texts of conversation between-speakers of the first language and the second language in the specified memory area, and printing out the supplementary information together with the conversational texts as required.

The invention has the following effects.

(1) Because the speaker of the first language can know the ratio of the memory area used up to store the vocal input to the total memory capacity of the electronic interpreting machine in real time by means of a graph or remaining time timer or other, such a situation as the conversational text is interrupted amid a phrase, and smooth conversation between different languages can be achieved.

(2) In case voice recognition of the first language resulted in a failure, the speaker can immediately know the failure and do over the vocal input with accurate pronunciation, thus conversation between different languages can be continued.

(3) Even when a part of conversational text is mis-recognized during voice recognition of the first language, only the part which was mis-recognized can be corrected without doing over the input of the whole text, and therefore correct conversation can be done efficiently.

(4) The first language and the second language are automatically interchanged every time one unit of conversation is completed, eliminating the tedious key operation of specifying the input language and the output language every time, thus making it possible to have smooth conversation between different languages.

(5) Because conversation between different languages can be stored and printed out, the stored data can be utilized as the record of proceedings or chronological record of conversation.

(6) Capability of retrieving the stored text and doing edit operations such as deletion, addition and correction makes it possible to compile further useful record of proceedings or chronological record of conversation.

(7) When registering information on the speaker, it is made possible to set the inputs of date and place of conversation, name, address and company of the speaker and other supplementary information and register them when registering the speaker information, and print out the supplementary information together with the conversational texts as required, and is capable of compiling official record of proceedings or a chronological record of the conversation.

What is claimed is:

1. An electronic interpreting machine comprising:

vocal input means for vocal input of language;

dictionary means incorporating an input language dictionary for recognizing an input language vocally input as first language and one or more output language dictionary for translating the first language into another language;

language setting means for setting the input language as the first language and the output language as the second language;

voice recognition means for recognizing the first language with reference to the dictionary means and storing it;

translating means for translating the first language which has been recognized into the selected second language with reference to the dictionary means;

voice information generating means for generating voice information representing the translated second language; and voice output means for giving output of the generated voice information, the maximum amount of language information which can be vocally input being set beforehand, while the ratio of the amount of information which has been input to the vocal input means, to the maximum amount of input information which can be input in real time is computed and the result of computation is output.

2. The electronic interpreting machine as claimed in claim 1 further provided with:

recognition judging means for judging whether the voice recognition means could correctly recognize the first language which was vocally input; and recognition message generating means that generates a recognition message in the first language and a recognition message prompting to input in the first language again, and outputs the messages to the vocal output means or display means, in case it is judged that the recognition failed.

3. The electronic interpreting machine as claimed in claim 1 further provided with:

translation directing means that outputs a direction to start translation to the translation means in case the first language recognized by the vocal recognition means is correct;

key input means for correction input in case the recognized first language includes an error; and recognition correcting means for correcting the first language according to the correction input which is made through the key input means or to the correction input which is made through the vocal input means.

4. The electronic interpreting machine as claimed in claim 1 further provided with:

dictionary switching means that automatically switches the input language dictionary for the recognition of the first language and the output language dictionary for the translation of the first language into the second language, when the translation means has translated the first language to the specified second language and one paragraph of the translation has been completed.

5. The electronic interpreting machine as claimed in claim 1 further provided with:

input/output text storage means that stores the entire input/output text exchanged between the first language and the second language in the specified memory area;

print directing means that directs print-out of the stored input/output text; and printing information generating means that converts the input/output text to the specified print format and outputs it to printing means upon printing direction from the print directing means.

6. The electronic interpreting machine as claimed in claim 5 further provided with:

retrieval means that retrieves the input/output text stored in the input/output text storage means onto the screen of the display means; and editing means for edit operations such as addition, deletion and correction for the retrieved input/output text.

7. The electronic interpreting machine as claimed in claim 1 further provided with:

time setting means for setting the year, month and day when the input/output text is exchanged between the first language and the second language.

8. The electronic interpreting machine as claimed in claim 1 further provided with:

storage control means that adds to the input/output text and stores supplementary information including the date in a specified memory area of the input/output text storage means when the supplementary information such as the place where the input/output text is exchanged between the first language and the second language, names, addresses and company names of the speakers is input.

9. An electronic interpreting machine as in claim 1 further comprising:

recognition judging means for judging whether the voice recognition means could correctly recognize the first language which was vocally input: and recognition message generating means that generates a recognition message in the first language and a recognition message prompting to input in the first language again and outputs the messages to the vocal output means or display means. in case it is judged that the recognition failed;

translation directing means that outputs a direction to start translation to translation means in case the first language recognized by the vocal recognition means is correct;

key input means for correction input in case the recognized first language includes an error; and recognition correcting means for correcting the first language according to the correction input which is made through the key input means or to the correction input which is made through the vocal input means;

dictionary switching means that automatically switches the input language dictionary for the recognition of the first language and the output language dictionary for the translation of the first language into the second language, when the translation means has translated the first language to the specified second language and one paragraph of the translation has been completed;

input/output text storage means that stores the entire input/output text exchanged between the first language and the second language in the specified memory area;

print directing means that directs print-out of the stored input/output text; and printing information generating means that converts the input/output text to the specified print format and outputs it to printing means upon printing direction from the print directing means;

retrieval means that retrieves the input/output text stored in the input/output text storage means onto the screen of the display means; and editing means for edit operations such as addition, deletion and correction for the retrieved input/output text;

time setting means for setting the year, month and day when the input/output text is exchanged between the first language and the second language; and storage control means that adds to the input/output text and stores supplementary information including the date in a specified memory area of the input/output text storage means when the supplementary information such as the place where the input/output text is exchanged between the first language and the second language, names, addresses and company names of the speakers is input;

wherein the means are capable of being selected and operated so as to perform a desired function.

* * * * *